United States Patent [19]
Shiga et al.

[11] Patent Number: 5,760,485
[45] Date of Patent: Jun. 2, 1998

[54] STARTER

[75] Inventors: Tsutomu Shiga, Nukata-gun; Nobuyuki Hayashi, Nagoya; Masanori Ohmi, Anjo; Sadayoshi Kajino, Nagoya, all of Japan

[73] Assignee: Nippondenso Co., Ltd., Kariya, Japan

[21] Appl. No.: 600,991

[22] PCT Filed: Dec. 19, 1994

[86] PCT No.: PCT/JP94/02166

§ 371 Date: Mar. 1, 1996

§ 102(e) Date: Mar. 1, 1996

[87] PCT Pub. No.: WO96/19662

PCT Pub. Date: Jun. 27, 1996

[51] Int. Cl.⁶ .................. F02N 11/00; H02P 9/04
[52] U.S. Cl. .................. 290/38 R; 290/48
[58] Field of Search .............. 290/38 R, 38 A, 290/38 C, 38 B, 48; 74/6, 7 A, 7 R, 7 E

[56] References Cited

U.S. PATENT DOCUMENTS

| | | | |
|---|---|---|---|
| 4,268,772 | 5/1981 | Workman | 310/197 |
| 4,481,424 | 11/1984 | Hattori et al. | 290/40 |
| 4,674,344 | 6/1987 | Kazino et al. | 74/7 A |
| 4,819,975 | 4/1989 | Morishita et al. | 290/48 |
| 4,970,908 | 11/1990 | Isozumi et al. | 74/7 E |
| 5,130,596 | 7/1992 | Umeki | 310/234 |
| 5,508,566 | 4/1996 | Nagao et al. | 290/38 R |

FOREIGN PATENT DOCUMENTS

| | | |
|---|---|---|
| 387 073 | 9/1990 | European Pat. Off. . |
| 387 666 | 9/1990 | European Pat. Off. . |
| 0 582 429 | 2/1994 | European Pat. Off. . |
| 582 429 | 2/1994 | European Pat. Off. . |
| 2 614 363 | 10/1988 | France . |
| 3-115776 | 5/1991 | Japan . |

*Primary Examiner*—Thomas M. Dougherty
*Assistant Examiner*—Nicholas Ponomarenko
*Attorney, Agent, or Firm*—Cushman Darby & Cushman IP Group of Pillsbury Madison & Sutro LLP

[57] ABSTRACT

A starter is provided that includes a starter motor having an armature core with an armature coil wound therearound and an armature shaft for rotatably holding the armature core. A drive shaft is further provided having a pinion that meshes with a ring gear of an engine. A reduction gear mechanism is interposed between the drive shaft and the armature shaft for reducing the rotation relative to the armature shaft to transmit the reduction rotation to the drive shaft. The reduction gear mechanism has a speed reduction ratio of 6:1 to 10:1.

11 Claims, 21 Drawing Sheets

$$R = \frac{W l}{L}$$

1

STARTER

This application claims benefit of international application PCT/JP94 02166, filed Dec. 19, 1994.

TECHNICAL FIELD

The present invention relates to a starter having a speed reduction gear mechanism for starting an engine.

BACKGROUND ART

In the prior art, as disclosed in Japanese Patent Laid-Open No. 238171/1990, there has been provided a starter having a planetary reduction gear mechanism, which has its motor small-sized by setting the planetary speed reduction ratio to 5.45 at the maximum.

In the aforementioned construction of the prior art, however, only the size reduction of a motor is intended to achieve by increasing the planetary reduction ratio, but no consideration has been taken into the size reduction of the starter in its entirety. Specifically, as the reduction gear ratio increases, the tooth number of an internal gear of the planetary reduction gear mechanism increases to enlarge the external diameter of the internal gear. As a result, the planetary reduction gear mechanism has its volume increased in proportion to the square of the external diameter of the internal gear. Thus, there arises a difficulty that the reduction gear mechanism is large-sized although the motor can be small-sized by increasing the gear ratio.

As a result of the increase in the reduction gear ratio, moreover, the rotational energy E, as expressed by the following equation, of an armature of the motor will increase in proportion to the square of the rotating angular velocity (i.e., R.P.M.) w with respect to an inertial moment J of the armature:

$$E = Jw^2/2.$$

As the reduction gear ratio increases, the rotating angular velocity w of the armature may increase to cause a meshing impact at the start of the starter or a serious impact torque at the re-meshing time during the inertial rotation of the starter thereby to break the torque transmitting parts of the starter. Thus, the reduction gear ratio increasing means is exemplified by the method, in which the gear specification M (or module) is decreased to increase the reduction gear ratio while suppressing the external diameter of an internal gear, but a problem of the tooth strength is left unsolved. Another method of increasing the reduction gear ratio by decreasing the tooth number of a sun gear has to make the diameter (as will be called the "deddendum diameter of the sun gear") of a bearing adjacent to the sun gear smaller than that of the prior art, thus leaving the strength problem unsolved.

According to the increase in the reduction gear ratio, moreover, the heat radiation from the surface of the starter motor decreases. This is found from the fact that the heat radiation is proportional to the area $m^2$, as generally expressed by the following equation:

$$E = C(T/100)^4 [kj/m^4 h],$$

wherein

C: Radiation Constant of Object; and

T: Absolute Temperature.

The present invention has been conceived in view of the background thus far described and has an object to provide a starter which can be small-sized in its entirety by clarifying the optimum range of the reduction gear ratio.

DISCLOSURE OF THE INVENTION

In order to achieve the above-specified object, according to the present invention, there is provided a starter comprising: a starter motor including an armature core having an armature coil wound thereon and an armature shaft for holding the armature core rotatably; a drive shaft having a pinion meshing with a ring gear of an engine; and one reduction gear mechanism interposed between the drive shaft and the armature shaft of the starter motor for reducing the rotation of the armature shaft to transmit the reduced rotation to the drive shaft, wherein the reduction gear mechanism has a reduction ratio of 6:1 to 10:1.

In this construction, the reduction ratio of the reduction gear mechanism is set within such an optimum range of 6 to 10 as viewed from the volume of the motor and the reduction gear mechanism of the starter, so that the starter can be most effectively reduced in size and weight.

In addition to the aforementioned construction, the armature coil includes: upper-layer and lower-layer coil members fitted in the slots of the armature core; first connection portions connected to one end of the lower-layer coil member and extending generally in parallel with the axial end face of the armature core and in the shaft direction; and second connection portions connected to one end of the upper-layer coil member and the other end of the first connection portions and extending generally in parallel with the first connection portions.

According to this construction, the first and second connection portions are arranged generally in parallel with the end face of the armature shaft, and the second connection portions are connected to the other end of the first connection portions so that the first and second connection portions can be accommodated in the small gaps axially protruding from the armature core. As a result, a cylindrical commutator and the armature coil of the prior art can have their inertias reduced mainly as the armature.

As will be shown in FIG. 6, moreover, the ratio l'/L' in the reaction force R'=w'l'/L' of the bearing at the sun gear side can be made smaller by that of the cylindrical commutator than the ratio l/L of the prior art, as shown in FIG. 26, so that the bearing reaction force R' can be reduced by the weight of the cylindrical commutator and the value l'/L'.

Owing to the reductions of the inertia of the armature and the bearing reaction force R', therefore, the bearing diameter can be made far smaller than that of the prior art so that the specification M (or module) and the tooth number (or the deddendum diameter) of the sun gear can be reduced to set the reduction ratio I=6:1 to 10:1 within the range in which the inner gear has its external diameter smaller than that of the motor of the prior art.

As will be shown in FIGS. 6 and 26, furthermore, the bearing span L can be shortened to L' by a length of the cylindrical commutator so that the deflection of the shaft can be reduced to take advantages in the inclination and pinch of the bearing and to make a high contribution to the shortening of the axial length of the motor.

In addition to the foregoing constructions, the starter further comprises: insulators interposed between the first connection portions and the armature core and between said first connection portions and the second connection portions; and brushes arranged slidably on the second connection portions.

As to the problem of the heat resistance, according to this construction, the first and second connection portions are disposed close to the side of the armature core through the insulators so that the heat to be generated by the resistance between the brushes and the second connection portions can be transferred directly to the armature core. Thus, it is possible to solve the problem of the reduction of heat resistance of the motor to be caused by the size reduction.

In addition, the starter further comprises a cooling fan for cooling the sliding faces of the starter motor with the brushes.

According to this construction, the cooling fan can reliably cool the resistance heat to be generated at the brushes and the second connection portions.

In addition, the starter further comprises grooves formed between the second connection portions to protrude with respect to the rotating direction of the armature shaft so that they act as the cooling fan for producing a cooling wind when the armature coil rotates.

According to this construction, the cooling fan is exemplified by the grooves formed between the adjoining second connection portions, and no separate cooling fan need be added so that the number of parts can be reduced.

In addition, the reduction gear mechanism is a planetary reduction gear mechanism including: a sun gear formed at one end of the armature shaft; a planetary gear mounted on one end of the drive shaft and meshing with the sun gear; and an internal gear meshing with the planetary gear for forming a stationary side.

According to this construction, the starter can be drastically reduced in size and weight.

In addition, the starter further comprises limit means for limiting the power supply to the starter motor within a predetermined time period.

According to this construction, limit means is enabled to prevent the power supply to the starter motor thereby to suppress the abnormal temperature rise by arranging heat sensing elements such as bimetal elements at portions to receive the heat of the motor such as the motor heating portion, the yoke, the field device, the brush device, the end room and by using a protector circuit.

BEST MODE FOR CARRYING OUT THE INVENTION

Figure 1:
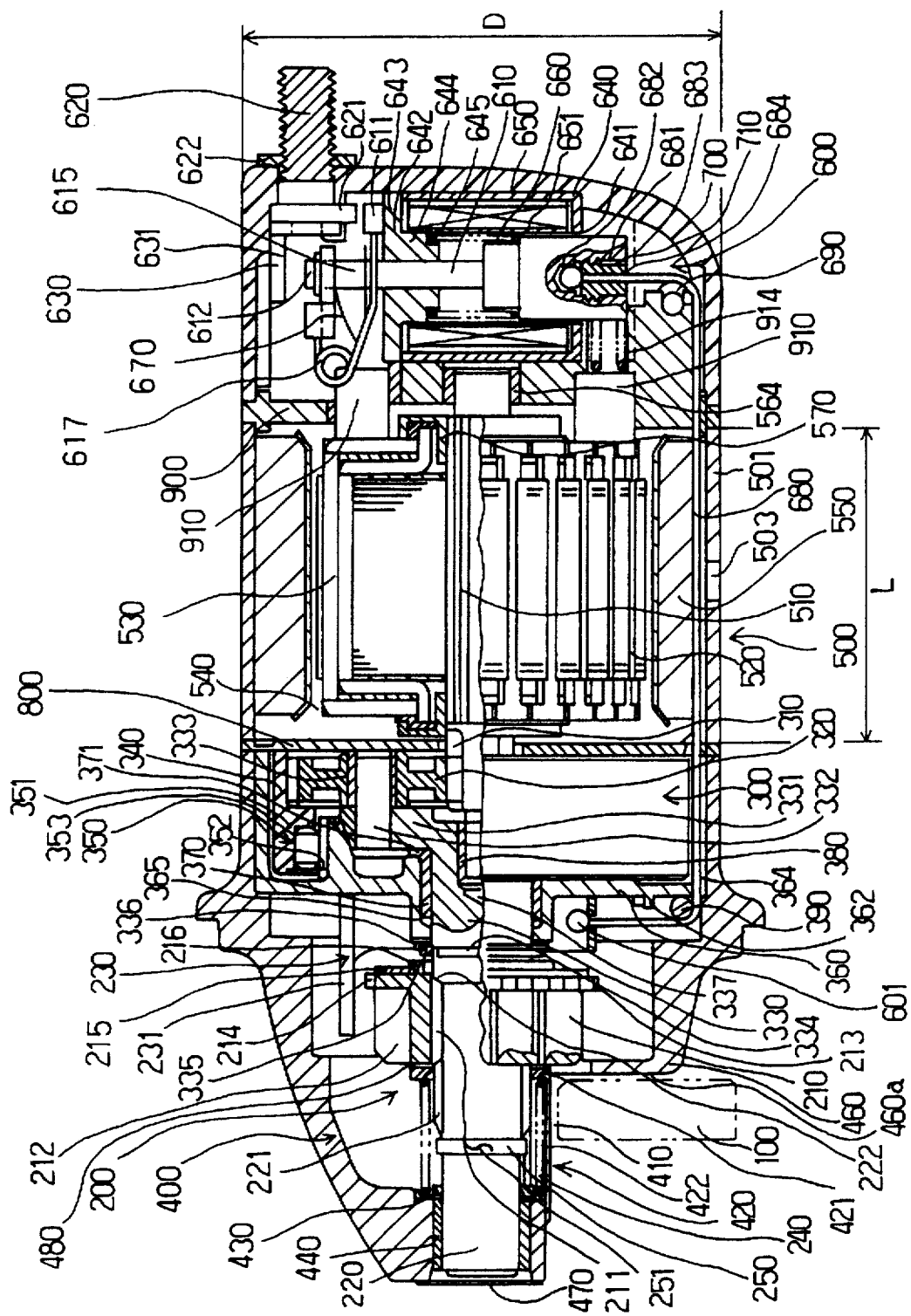
FIG. 1 is a sectional side elevation showing the embodiment of a starter of the present invention.
Figure 2:
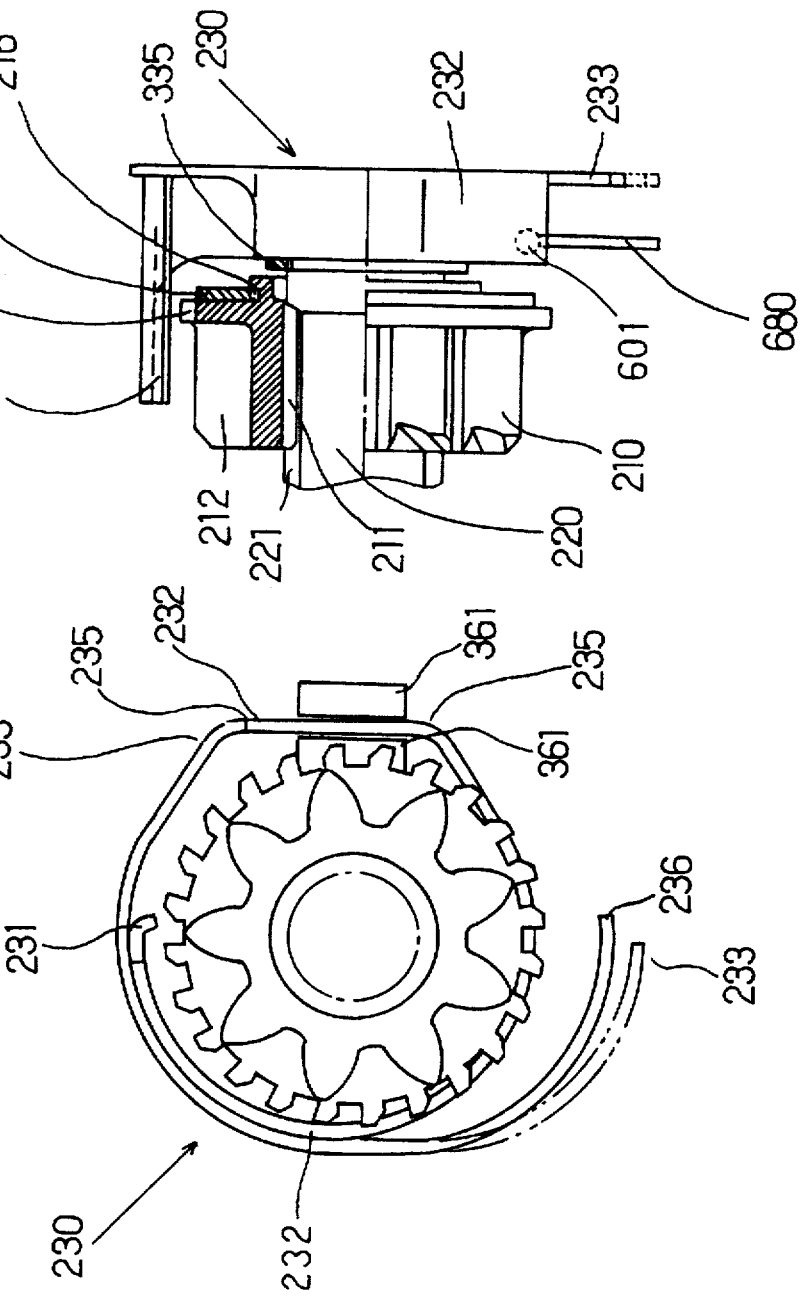
FIGS. 2A and 2B are a front elevation and a partially sectional side elevation when a pinion rotation regulating member is assembled with a pinion portion.
Figure 3:
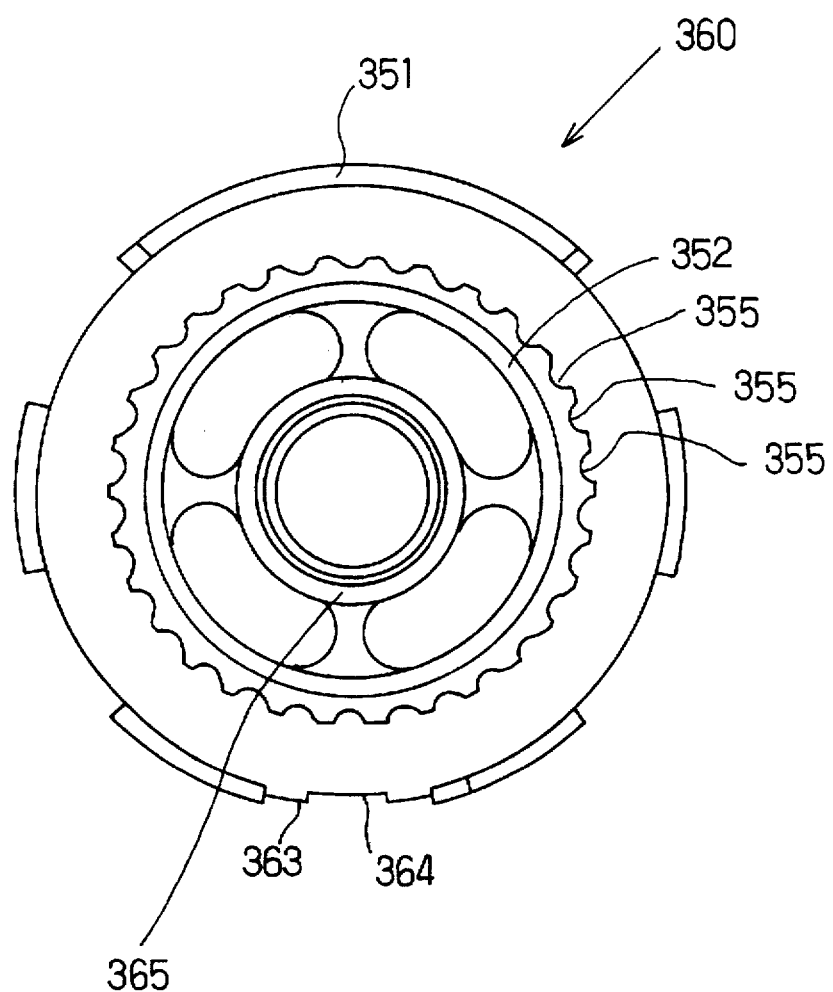
FIG. 3 is a rear elevation of a center bracket.
Figure 4:
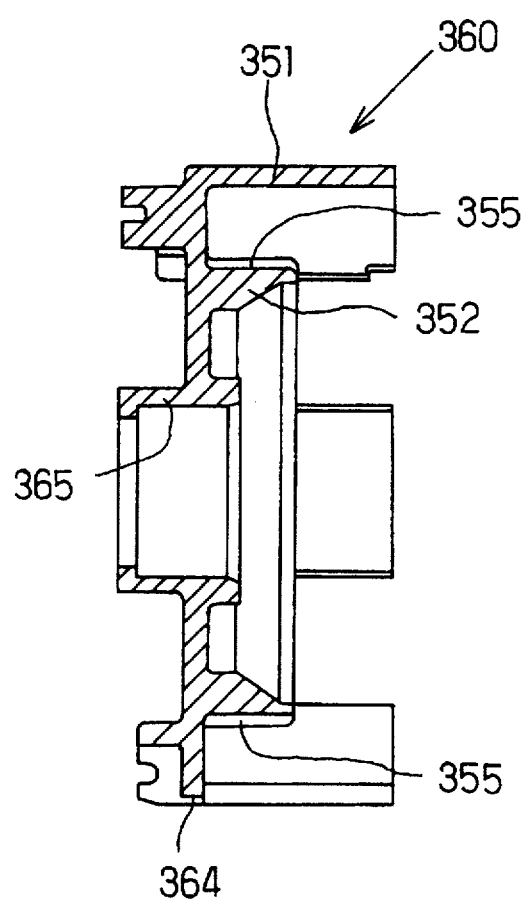
FIG. 4 is a sectional side elevation of a center bracket.
Figure 5:
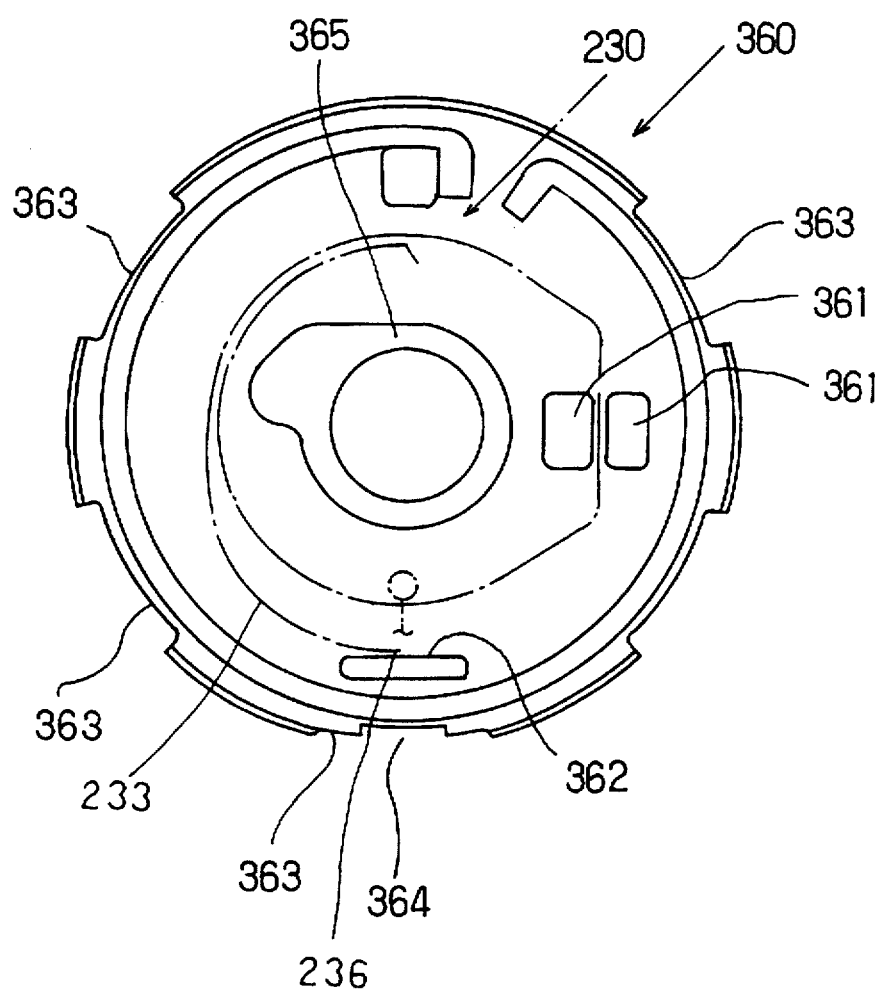
FIG. 5 is a front elevation of the center bracket.
Figure 6:
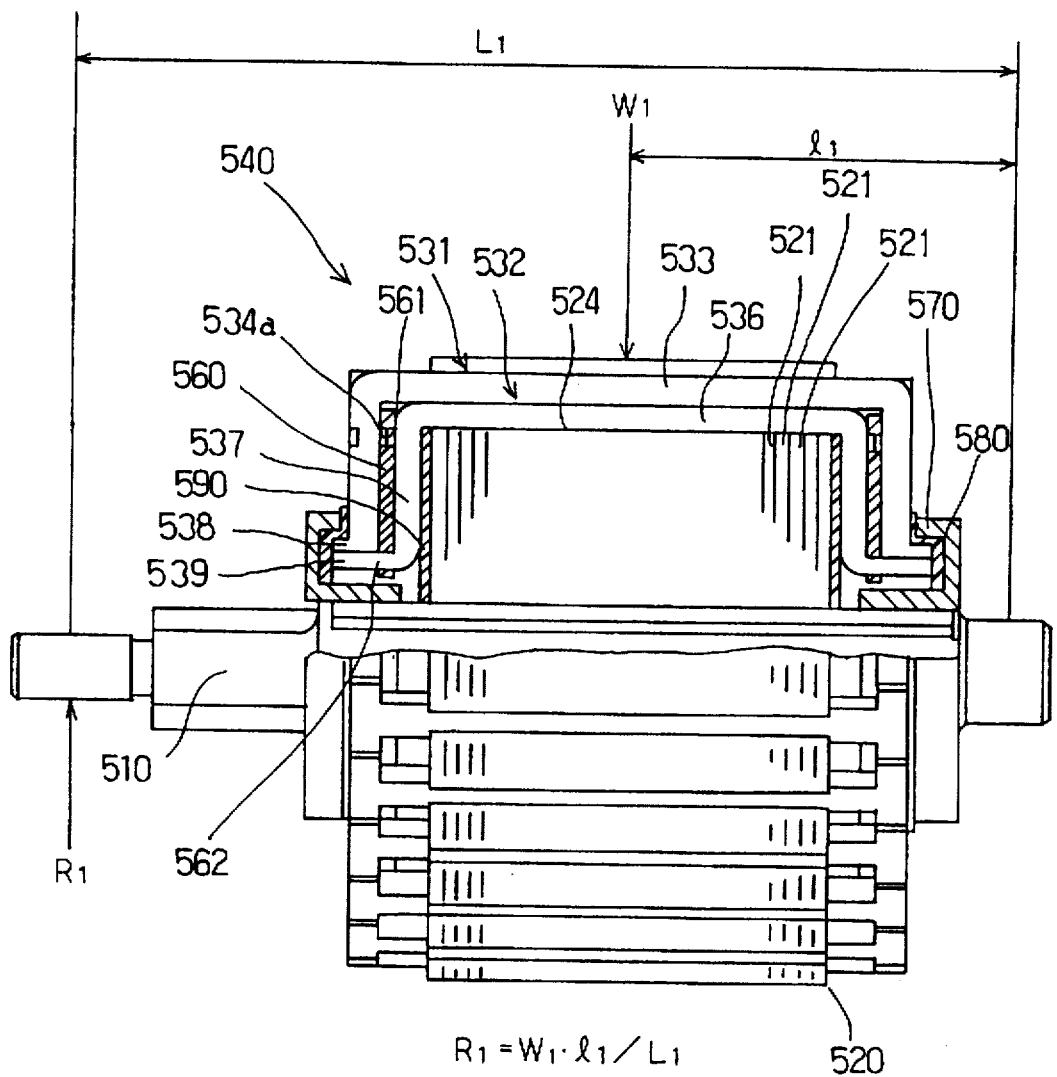
FIG. 6 is a sectional side elevation of an armature.

Next, a starter of the present invention will be described in connection with its embodiment with reference to FIGS. 1 to 25.

The starter is generally divided into: a housing 400 enclosing a pinion 200 meshing with a ring gear 100 arranged at an engine and a planetary gear mechanism 300; a motor 500; and an end frame 700 enclosing a magnet switch 600. In the starter, moreover, the housing 400 and the motor 500 are partitioned by a motor partition 800, and the motor 500 and the end frame 700 are partitioned by a brush holding member 900.

[Description of Pinion 200]

As shown in FIGS. 1, 2A or 2B, the pinion 200 is formed with a pinion gear 210 meshing with the ring gear 100 of the engine.

The pinion gear 210 is formed in its circumference with a pinion helical spline 211 to be fitted in a helical spline 221 formed in an output shaft 220. The pinion gear 210 is formed, at the side opposed to a ring gear 100, with an annular flange 213 having a larger diameter than the external diameter of the pinion gear 210. This flange 213 is formed all over its outer circumference with teeth 214 having a larger number than that of the external teeth of the pinion gear 210. These teeth 214 are provided for fitting a regulating pawl 231 of a later-described pinion rotation regulating member 230. A washer 215 is made rotatable at the rear face of the flange 213 but prevented from axially coming out by bending an annular portion 216, which is formed at the rear end of the pinion gear 210, toward the outer circumference.

On the other hand, the pinion gear 210 is always urged backwards of the output shaft 220 by a return spring 240 made of a compression coil spring.

[Description of Pinion Rotation Regulating Member 230]

A rotation regulating portion 232 is formed at its one end with the regulating pawl 231 which forms a regulating portion axially extending to engage with the numerous teeth 214 formed in the flange 213 of the pinion gear 210. The regulating pawl 231 is fitted in the teeth 214 of the pinion gear 210 and is folded radially inwards to have an L-shaped section.

Here will be described the operations of the pinion rotation regulating member 230. A string member 680 is transmission means for transmitting the operation of the magnet switch 600 to the regulating pawl 231. The string member 680 is caused by the operation of the magnet switch 600 to pull the rotation regulating portion 232 downwards thereby to establish the engagement between the regulating pawl 231 and the teeth 214 of the flange 213 of the pinion gear 210. At this time, a return spring portion 233 has its one end portion 236 abutting against a position regulating shelf 362 to bend the return spring portion 233. Since the regulating pawl 231 engages with the teeth 214 of the pinion gear 210, the pinion gear 210 is moved forwards, when turned through an armature shaft 510 of the motor 500 and the planetary reduction mechanism 300, along the helical spline 221 of the output shaft 220. When the pinion gear 210 comes into abutment with the ring gear 100 so that its forward movement is blocked, the pinion rotation regulating member 230 itself is bent by the further rotating force of the output shaft 220 so that the pinion gear 210 is slightly rotated to mesh with the ring gear 100. As the pinion gear 210 moves forwards, the regulating pawl 231 goes out of engagement with the teeth 214 so that the regulating pawl 231 drops at the back of the flange 213 of the pinion gear 210 to have its front end abutting the rear face of the washer 215 hereby to prevent the pinion gear 210 from being retracted by the rotation of the ring gear 100 of the engine.

Simultaneously as the operation of the magnet switch 600 is interrupted to stop the downward pull of the rotation regulating portion 232 by the string member 680, the rotation regulating portion 232 is returned to its original position by the action of the return spring portion 233.

[Description of Pinion Retaining Ring 250]

The pinion retaining ring 250 is fixed in the annular groove which is formed around the output shaft 220 to have a square section. This pinion retaining ring 250 is shaped by rounding a steel bar having a square section and is formed on its two ends with generally S-shaped corrugations 251 (i.e., examples of engaging means), one of which has its ridge engaging with the recess of the other and the other of which has its ridge engaging with the recess of the former.

[Description of Planetary Gear Mechanism 300]

The planetary gear mechanism 300 is reduction means for reducing the rotational speed of the later-described motor 500 to augment the output torque of the motor 500, as shown in FIG. 1. This planetary gear mechanism 300 is composed of: a sun gear 310 (having a tooth number of $Z_s=8$) formed on the outer circumference of the front side of the armature shaft 510 (as will be described later) of the motor 500; three pairs of planetary gears 320 (having a tooth number of $Z_p=25$) made rotatable around the sun gear 310; a planet carrier 330 made integral with the output shaft 220 for supporting the planetary gears 320 rotatably around the sun gear 310; and an internal gear 340 (having a tooth number $Z_i=58$) made of a resin into a cylindrical shape meshing with the outer circumferences of the planetary gears 320.

The reduction ratio of the planetary gear mechanism 300 will be described on the basis of the characteristic diagram plotting the reduction ratio on the abscissa and the volume on the ordinate of FIG. 25. Here: letter D indicates the external diameter of the yoke 501 of the starter shown in FIG. 1; letter L the axial length of the yoke 501; and the volume $V_1$ of the starter motor is expressed by $V_1 = \pi D^2 L / 4$. On the other hand, the volume $V_2$ of the planetary gear mechanism 300 is expressed, if the internal gear 340 has an external diameter d and an axial length l, by $V_2 = \pi d^2 l / 4$. Hence, the volume $V_T = V_1 + V_2$ influencing the starter is expressed by:

$$V_T = V_1 + V_2 = \pi D^2 L / 4 + \pi d^2 l / 4.$$

Figure 25:
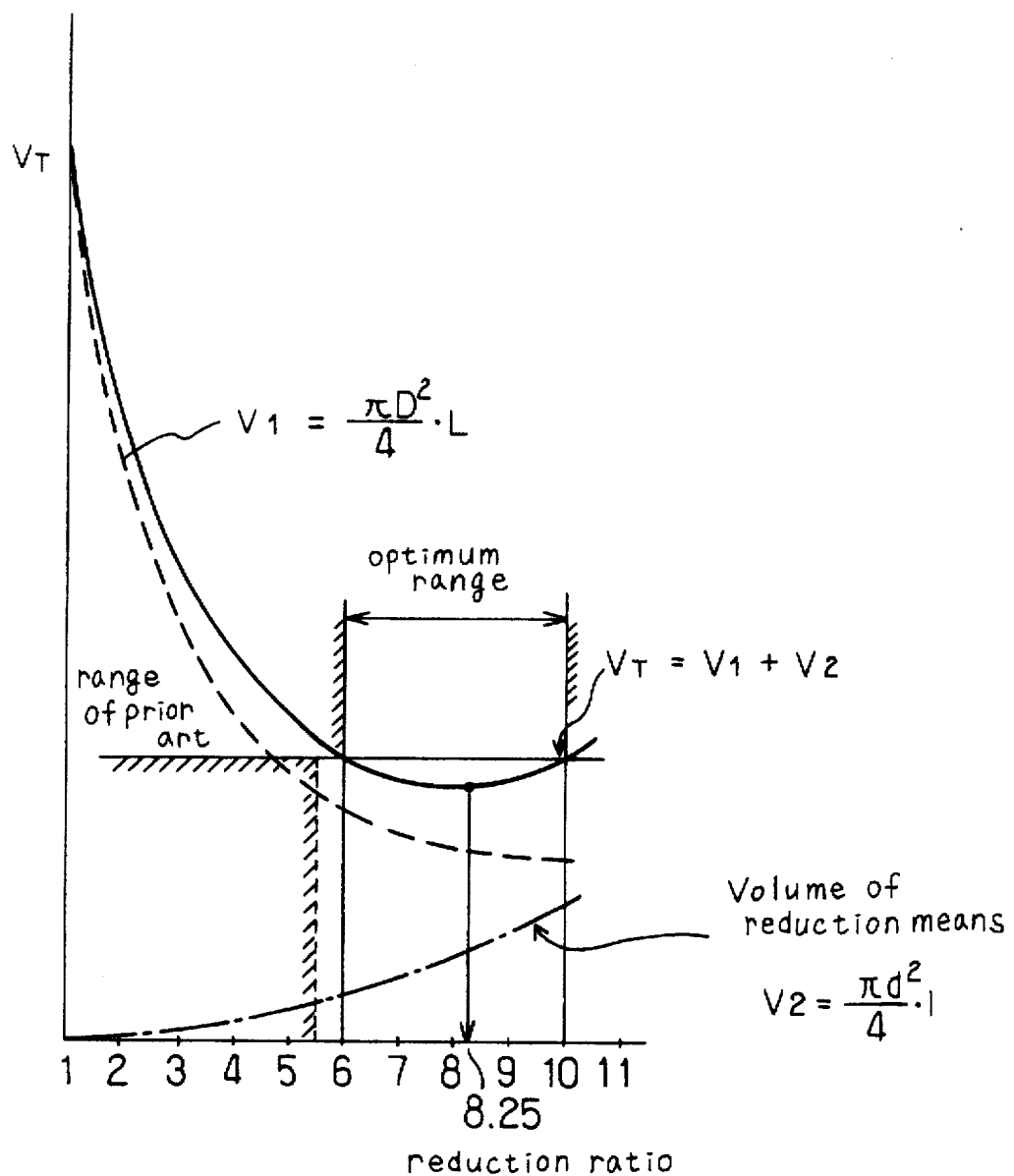
FIG. 25 is a characteristic chart illustrating the relations between a volume and a reduction ratio.
Figure 26:
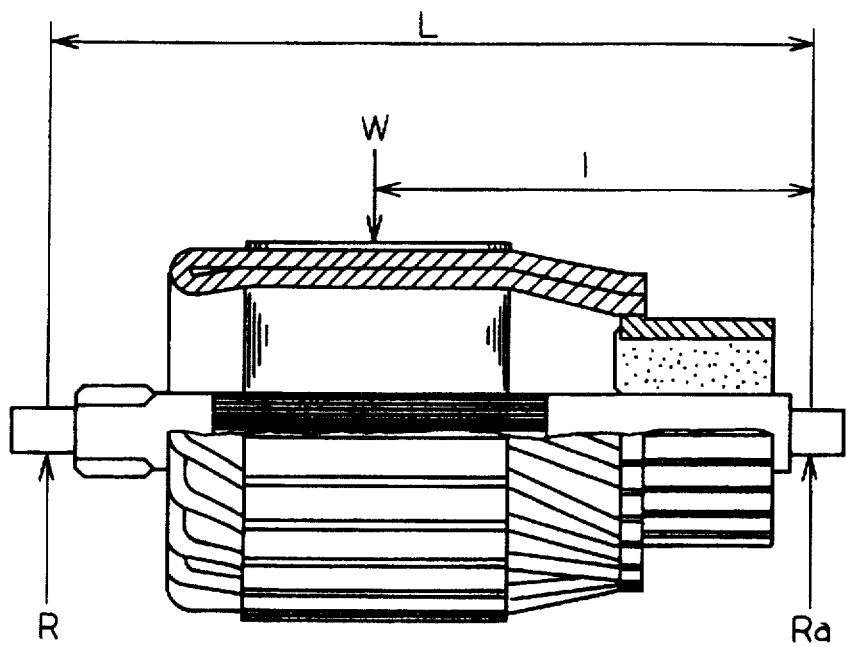
FIG. 26 is a section showing the armature of the prior art.

It is apparent from FIG. 25 that the volume $V_1$ of the starter decreases as the reduction ratio rises, as indicated by the dotted curve, whereas the volume $V_2$ of the planetary gear mechanism 300 gradually increases as the reduction ratio rises, as indicated by the single-dotted curve. As a result, the total volume $V_T$ takes its minimum at a reduction ratio (in the vicinity of 8) and then rises again at a higher reduction ratio.

In order to reduce the total volume $V_T$ of the starter, it is effective to set the reduction ratio to 6:1 to 10:1. Specifically, the reduction ratio around 8:1 is effective. The planetary gear mechanism described above satisfies the meshing condition of the planetary gear of $Z_s + Z_i / N$ (i.e., the number of planetary gears)=Rectification to determine the following reduction ratio:

$$I = Z_i / Z_s + 1, \quad I = 8.25.$$

In the optimum range of reduction ratio of 6:1 to 10:1, as illustrated in the chart of FIG. 25 of the relation between the motor size at the rated output of 12V (volts)–0.6 KW (kilowatts) to 3.0 KW 24 V–2.0 KW to 5.5 KW and the volume of the reduction gear mechanism, I=8.25 is selected as the most optimum value. Moreover, the result of selecting the gears used in the embodiment is enumerated in Table 1.

TABLE 1

| M | Zs | Zi (mm) | I | Di (mm) | Maximum Zi (mm) | Deddendum Diameter Zs (mm) |
|---|---|---|---|---|---|---|
| 1.25 | 11 | / | / | / | less than | 11.9 |
|  | 10 | / | / | / | or | 10.6 |
|  | 9 | 39 | 5.33 | 56 | equal to | 9.4 |
|  | 8 | 40 | 6.0 | 57 | 41 | 8.1 |
| 1.1 | 11 | / | / | / | less than | 10.45 |
|  | 10 | / | / | / | or | 9.35 |
|  | 9 | 45 | 6.0 | 52 | equal to | 8.25 |
|  | 8 | 46 | 6.75 | 57 | 47 | 7.15 |
| 1.0 | 11 | 52 | 5.72 | 58 | less than | 9.5 |
|  | 10 | 50 | 6.0 | 55 | or | 8.5 |
|  | 9 | 51 | 6.66 | 58 | equal to | 7.6 |
|  | 8 | 52 | 7.5 | 58 | 52 | 6.5 |
| 0.9 | 11 | 55 | 6.0 | 56 | less than | 8.55 |
|  | 10 | 56 | 6.6 | 57 | or | 7.65 |
|  | 9 | 57 | 7.33 | 58 | equal to | 6.75 |
|  | 8 | 58 | 8.25 | 58 | 58 | 5.85 |
| 0.8 | 12 | 63 | 6.25 | 56 | less than | 8.4 |
|  | 11 | 64 | 6.8 | 57 | or | 7.6 |
|  | 10 | 62 | 7.2 | 56 | equal to | 6.8 |
|  | 9 | 63 | 8.0 | 56 | 65 | 6.0 |
|  | 8 | 64 | 9.0 | 57 |  | 5.2 |

The restricting conditions are: the external diameter of the motor 1 is set to 68 from the standpoint of reducing the size of the starter; and the external diameter D1 of internal gear 22 is set to 58. Moreover, a sun gear 12 is set to have an ordinarily manufacturable value $Z_s=8$, a stress distribution satisfied to reduce the inertia of armature 540, a lower limit M module up to 0.8, a deddendum diameter Zs to more than 5 (mm) and a transposition to 0.5.

[Description of Overrunning Clutch 350]

The overrunning clutch 350 is so supported as to rotate the internal gear 340 only in one direction (to rotate in response to the revolution of the engine). This overrunning clutch 350 is composed of a clutch outer 351 made integral with the front side of the internal gear 340 to form a first cylindrical portion, an annular clutch inner 352 formed at the rear face of a center bracket 360 to form the stationary side covering the front of the planetary gear mechanism 300 and a second cylindrical portion arranged to confront the inner circumference of the clutch outer 351, and rollers 353 fitted in a roller path formed at an inclination in the inner circumference of the clutch outer 351.

[Description of Center Bracket 360]

The center bracket 360 is arranged in the rear side of the housing 400. The housing 400 and the center bracket 360 are connected by a ring spring 390, which has its one end retained by the housing 400 and its other end retained by the center bracket 360, so that the rotational reaction to be received by the clutch inner 352 forming part of the overrunning clutch 350 may be absorbed by the ring spring 390 and prevented from being transmitted directly to the housing 400.

[Description of Planet Carrier 330]

The planet carrier 330 is equipped at its rear end with a flanged projection 331 radially extending for supporting the planetary gear 320. In this flanged projection 331, there is fixed a pin 332 extending backwards for supporting the planetary gear 320 rotatably through a metal bearing 333.

Moreover, the planet carrier 330 is rotatably supported by a housing bearing 440 having its front end portion fixed in the front end of the housing 400, and a center bracket bearing 370 fixed in an inner cylindrical portion 365 of the inner circumference of the center bracket 360.

This planet carrier 330 is formed at its front end with an annular groove 334, in which is fitted a stop ring 335. Between this stop ring 335 and the front end of the inner cylindrical portion 365, there is interposed a washer 336 which is made rotatable with respect to the planet carrier 330. When the stop ring 335 comes into abutment against the front end of the inner cylindrical portion 365 through the washer 336, the planet carrier 330 is regulated from moving backwards. Moreover, the center bracket bearing 370 supporting the rear side of the planet carrier 330 is formed at its rear end with a flanged portion 371 which is interposed between the rear end of the inner cylindrical portion 365 and the flanged projection 331. When this flanged projection 331 comes into abutment against the rear end of the inner cylindrical portion 365 through a flanged portion 371, the planet carrier 330 is regulated from moving forwards.

Incidentally, the planet carrier 330 is formed in its rear face with an axially extending recess 337. A shaft 510 has its front end rotatably supported through a planet carrier bearing 380 which is arranged in that recess 337.

[Description of Housing 400]

The housing 400 supports the output shaft 220 in the housing bearing 440, which is fixed in the front end of the housing 400, and is equipped with a water shielding wall (as shown in FIG. 1) for minimizing the gap between the housing 400 and the external diameter of the pinion gear 210 below the opening 410 so as to minimize invasion of rain droplets or the like from an opening 410.

[Description of Shutter 420]

The shutter 420 is made of a resin material (e.g., nylon) and mounted around the output shaft 220. The shutter 420 is composed of a ring member 421 clamped between the return spring 240 and the pinion gear 210, and a water shielding portion 422 for opening/closing the opening 410 of the housing 400. This water shielding portion 422 is bent, as shown in FIG. 1, to be fitted from the two sides in two slide grooves (not shown) which are so formed in the lower portion of the front end of the housing 400 as to extend in the axial direction. As a result, the water shielding portion 422 can axially move together with the ring member 421 with respect to the housing 400. Incidentally, a washer 480 is interposed between the shutter 420 and the pinion gear 210.

The shutter 420 operates in the following manner. As the starter is started to move the pinion gear 210 forwards along the output shaft 220, the ring member 421 is moved forwards together with the pinion gear 210. Then, the water shielding portion 422 is moved forwards together with the ring member 421 to open the opening 410 of the housing 400. When the starter is stopped to move the pinion gear 210 backwards along the output shaft 220, the ring gear 421 is moved backwards together with the pinion gear 210. Then, the water shielding portion 422 is also moved backwards together with the ring member 421 to close the opening 410 of the housing 400. As a result, while the starter is not operating, the shutter 420 acting as the opening/closing means prevents the rain droplets, which are scattered by the centrifugal force of the ring gear 100, with the water shielding portion 422 from invading the housing 400.

[Description of Motor 500]

The motor 500 is enclosed by the yoke 501, the motor partition 800 and the later-described brush holding member 900. Incidentally, the motor partition 800 accommodates the planetary gear mechanism 300 together with the center bracket 360 and acts to prevent the lubricating oil in the planetary gear mechanism 300 from invading the motor 500.

The motor 500 is constructed of, as shown in FIG. 1, of: the armature 540 composed of the armature shaft 510, and the armature core 520 and an armature coil 530 fixed on the armature shaft 510 and made rotatable together; and stationary magnetic poles 550 for rotating the armature 540. These stationary magnetic poles 550 are fixed on the inner circumference of the yoke 501.

[Description of Armature Shaft 510]

The armature shaft 510 is rotatably borne by the planet carrier bearing 380 in the rear portion of the planet carrier 330 and a brush holding member bearing 564 fixed in the inner circumference of the brush holding member 900. The armature shaft 510 has its front end inserted in the planetary gear mechanism 300 and formed on its outer circumference with the sun gear 310 of the planetary gear mechanism 300.

[Description of Armature Core 520]

Figure 7:
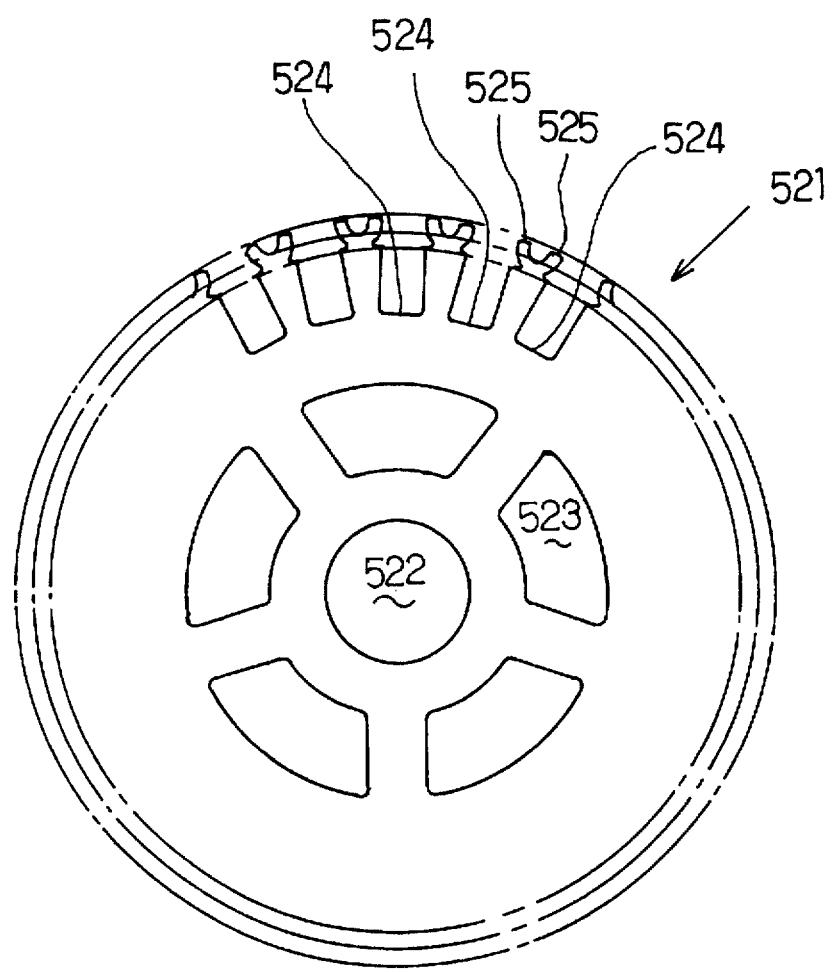
FIG. 7 is a top plan view of a core plate.
Figure 8:
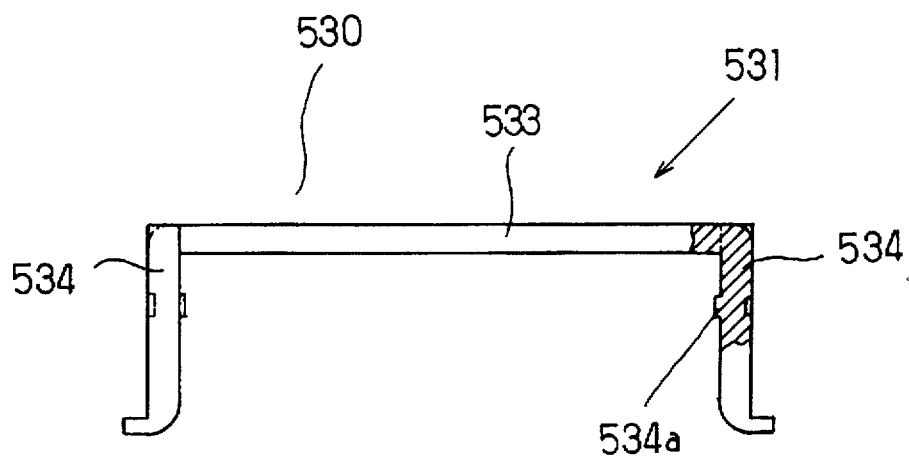
FIG. 8 is a side elevation of an upper coil bar.
Figure 9:
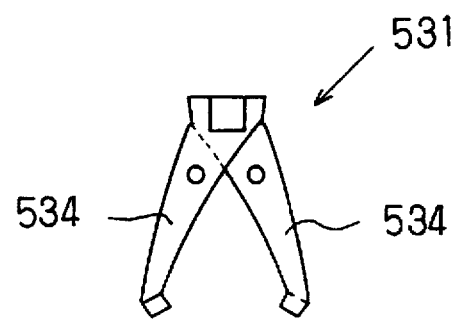
FIG. 9 is a front elevation showing the upper coil bar.

The armature core 520 is prepared by laminating a number of core plates 521, as shown in FIG. 7, and by press-fitting the armature shaft 510 in the hole 522 which is formed in the center of the laminate. The core plate laminate 521 is formed by pressing thin steel sheets and by insulating its surfaces. The core plate laminate 521 is formed in the radially internal side (or around the hole 522) with a plurality of punched holes 523 for lightening the core plate laminate 521 itself. This core plate laminate 521 is formed in its outer circumference with a plurality of (e.g., twenty five) slots 524 for receiving the armature coil 530. Moreover, the outer circumferential end of the core plate laminate 521 is formed between the individual slots 524 with fixing pawls 525 for fixing the armature coil 530 in the slots 524. The fixing pawls 525 will be described in the description of means for fixing the following armature coil 530.

[Description of Armature Coil 530]

The armature coil 530 adopted in the present embodiment is a double-layer coil which is prepared by radially laminating a plurality of (e.g., twenty five) upper-layer coil bars 531 and lower-layer coil bars 532 of the same number as that of the upper-layer coil bars 531. Moreover, these individual upper-layer coil bars 531 and lower-layer coil bars 532 are combined to have their end portions electrically connected to constitute an annular coil.

[Description of Upper-Layer Coil Bar 531]

The upper-layer coil bar 531 is made of a material having an excellent conductivity (e.g., copper) and is formed with: an upper-layer coil member 533 extending in parallel with the stationary magnetic poles 550 and held on the outer circumferential side of the slots 524; and two upper-layer coil ends 534 bent inwards from the two ends of the upper-layer coil member 533 and extending perpendicularly to the axial direction of the armature shaft 510 to form a second connection portion. Incidentally, the upper-layer coil member 533 and the two upper-layer coil ends 534 may be formed: integrally by the cold-casting; by the pressing into the C-bent shape; or by the seaming technique of welding the upper-layer coil member 533 and the two upper-layer coil ends 534 made separate.

Figure 10:
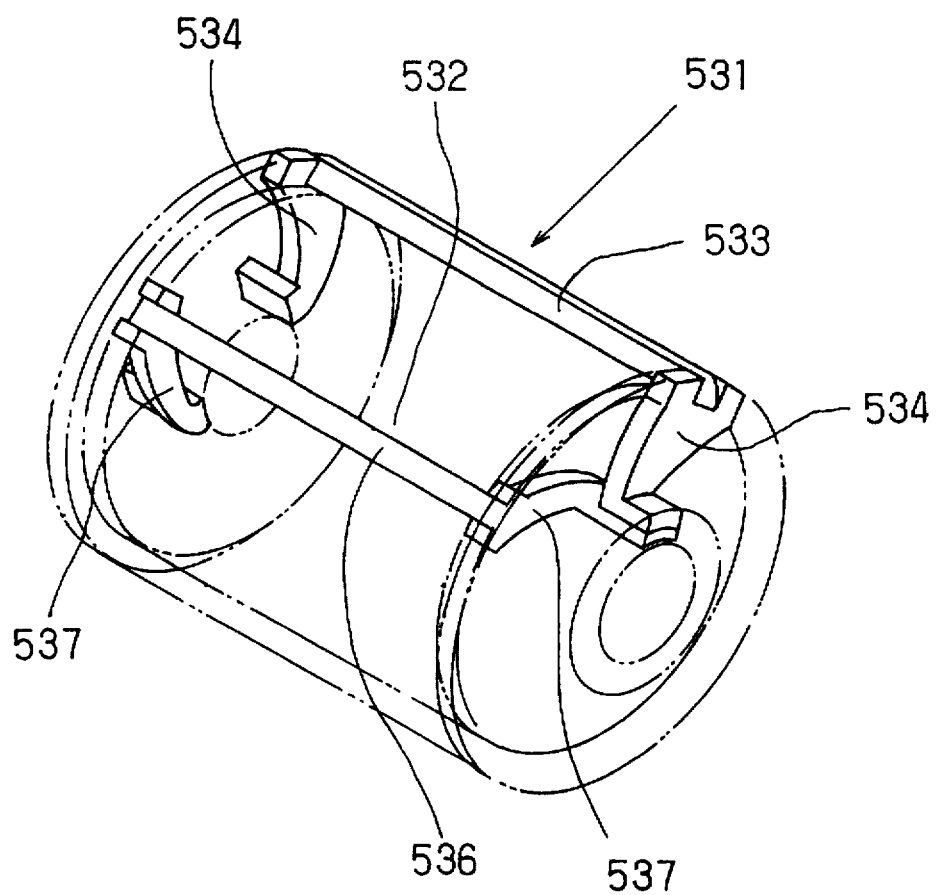
FIG. 10 is a schematic perspective view showing the arranged state of the upper coil bar and a lower coil bar.
Figure 11:
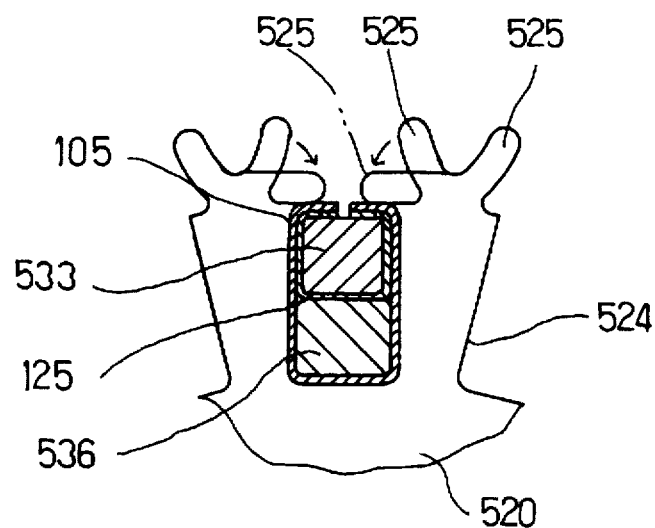
FIG. 11 is a section of an upper coil member and a lower coil member fitted in slots.

The upper-layer coil member 533 is a straight bar having a square section, as shown in FIGS. 8 to 11, and is so forced together with a later-described lower-layer coil member 536 into the slots 524 that it is covered with an upper-layer insulating film 125 (e.g., a thin film of a resin such as nylon or paper), as shown in FIG. 11.

Of the two upper-layer coil ends 534, as shown in FIG. 10, one upper-layer coil end 534 is inclined at the forward side with respect to the rotating direction whereas the other upper-layer coil end 534 is inclined at the backward side with respect to the rotating direction. These two upper-layer coil ends 534 are radially inclined at an equal angle with respect to the upper-layer coil member 533 and are formed into an identical shape. As a result, the upper-layer coil bar 531 takes its identical shape even after it is turned by 180 degrees on the upper-layer coil bar 531. In short, the two upper-layer coil ends 534 are made identical to provide an excellent workability when the upper-layer coil bar 531 is assembled with the armature core 520.

Of the two upper-layer coil ends 534, the upper-layer coil end 534, as located at the side of the magnet switch 600, comes into direct abutment with later-described brushes 910 to feed the armature coil 530 with the electric power. For this, at least the surface of the upper-layer coil ends 534, against which the brushes 910 are to abut, is smoothed. The starter of the present embodiment need not be equipped with any independent commutator for energizing the armature coil 530. In short, the independent commutator can be eliminated to reduce the number of parts and steps of manufacturing the starter thereby to suppress the production cost. Since, moreover, the starter need not be arranged therein with the independent commutator, another effect is that the starter can be axially small-sized.

Furthermore, the upper-layer coil ends 534 come into direct abutment against the brushes 910 so that the heat generated by the sliding contact between the upper-layer coil ends 534 and the brushes 910 propagates from the upper-layer coil ends 534 to the upper-layer coil member 533, the armature core 520 and the armature shaft 510. Since, however, the armature coil 530, the armature core 520 and the armature shaft 510 have larger heat capacities than those of the independent commutator of the prior art, the sliding contact portions between the upper-layer coil ends 34 and the brushes 910 can be kept at a low temperature.

Figure 12:
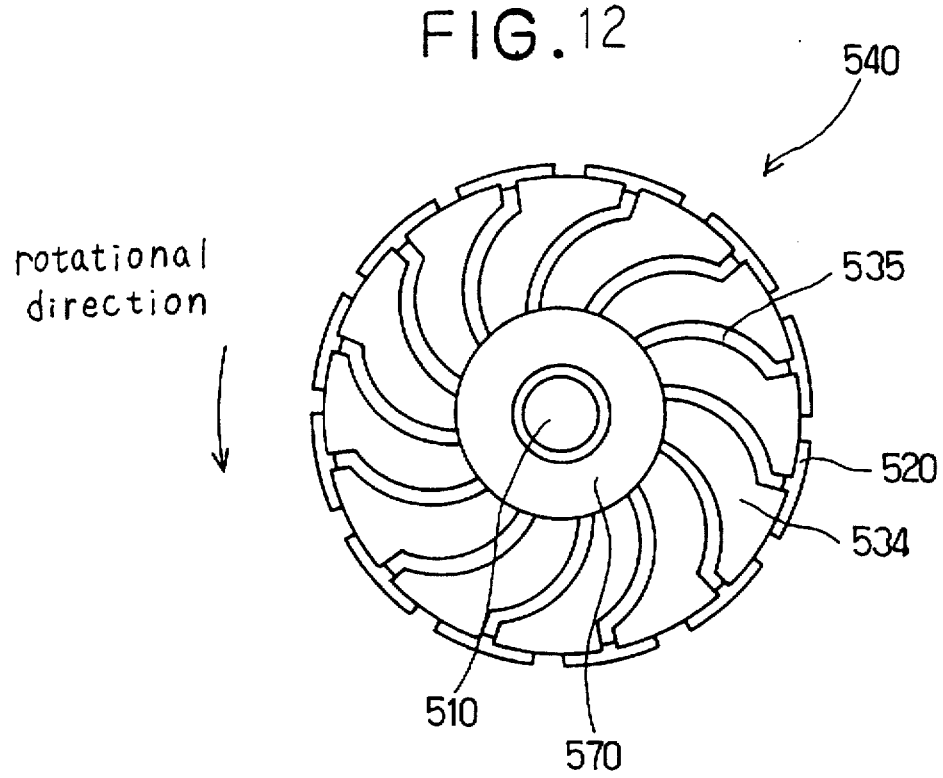
FIG. 12 is a front elevation of an upper coil end assembled with the core of an armature.

The upper-layer coil ends 534 are shaped, as shown in FIG. 12, to radially diverge and to have substantially equal circumferential lengths from the inner to outer circumferences. This considerably enlarges the contact areas between the upper-layer coil ends 534 and the brushes 910 to abut against each other. As a result, the brushes 910 get liable to have their heat dissipating to the coil bar so that their temperature can be suppressed to a very low level. Incidentally, FIG. 12 illustrates the shape of the upper-layer coil ends 534 schematically, and their number is not equal to that of the slots 524 of FIG. 8.

Moreover, grooves 535 formed between the individual upper-layer coil ends 534 to abut the brushes 910 are shaped so helical as to sweep back more in the rotating direction as they go radially outward, as shown in FIG. 12. Thanks to the swept-back shape of the grooves 535, the brushes 910 come into gradual abutment with the inner sides of the upper-layer coil ends 34 having the lower rotational speed to the outer sides having the higher rotational speed. As a result, the brushes 910 to abut the upper-layer coil ends 534 can be prevented from jumping at the upper-layer coil ends 534.

Figure 13:
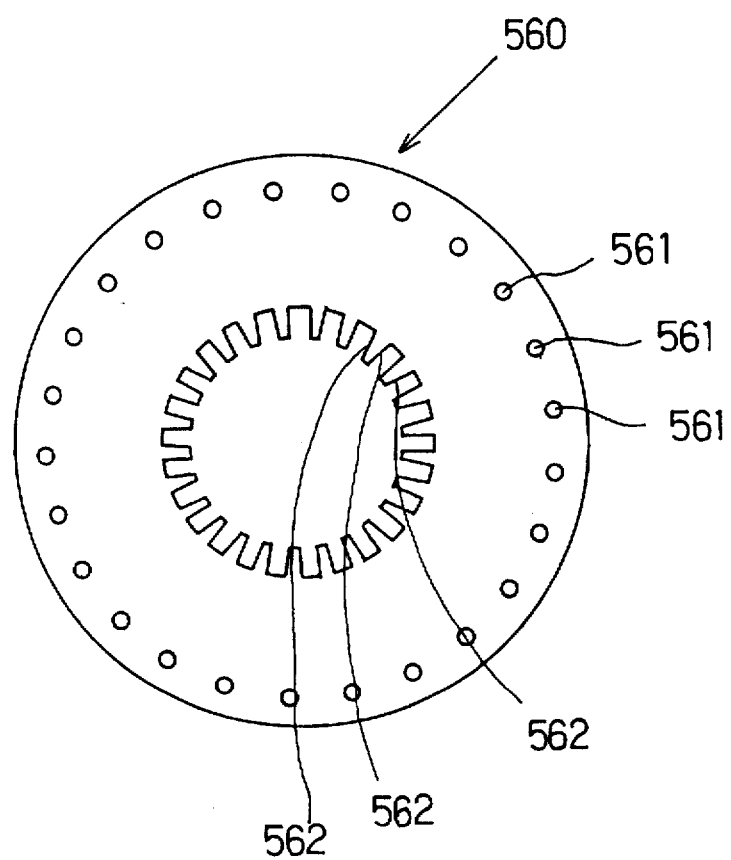
FIG. 13 is a front elevation of an insulating spacer.

As, moreover, the armature coil 530 is rotated, a centrifugal wind is established radially outward by the grooves 535. This centrifugal wind, as is established by the rotations of the individual grooves 535 of the individual upper-layer coil ends 534 to abut against the brushes 910 is used to cool the heat generated by the sliding contacts between the brushes 910 and the upper-layer oil ends 534 and to discharge the brushed powder to the outside, as will be described hereinafter. The two upper-layer coil ends 534 are formed on their confronting outer circumferences with axially protruding projections 534a having a smaller diameter. These projections 534a are arranged between the upper-layer coil ends 534 and later-described lower-layer coil ends 537 so that they are fitted in holes 561 formed in an insulating spacer 560 for insulating the upper-layer coil ends 534 and the lower-layer coil ends 537 (as shown in FIG. 13).

[Description of Lower-Layer Coil Bar 532]

The lower-layer coil bar 532 is made, like the upper-layer coil bar 531, of a material having an excellent conductivity (e.g., copper) and is formed with: the lower-layer coil member 536 extending in parallel with the stationary magnetic poles 550 and held on the inner side of the slots 524; and two lower-layer coil ends 537 bent inwards from the two ends of the lower-layer coil member 536 and extending perpendicularly to the axial direction of the shaft 510 Lo form a first connection portion. Incidentally, the lower-layer coil member 536 and the two lower-layer coil ends 537 may be formed, as in the upper-layer coil bar 531: integrally by the cold-casting; by the pressing into the C-bent shape; or by the seaming technique of welding the lower-layer coil member 536 and the two lower-layer coil ends 537 made separate.

Incidentally, the insulations between the individual upper-layer coil ends 534 and the individual lower-layer coil ends 537 are retained by the insulating spacer 560, and the insulations between the individual lower-layer coil ends 537 and the armature core 520 are retained by an insulating ring 590 made of a resin (e.g., nylon or phenolic resin).

The lower-layer coil member 536 is a straight bar having a square section, as shown in FIGS. 8 to 11, and is forced together with the upper-layer coil member 533 into the slots 524. Incidentally, the lower-layer coil member 536 is so fitted in the slots 524 together with the upper-layer coil member 533 covered with the upper-layer insulating film 125, while being covered with a lower-layer insulating film 105 (made of nylon or paper).

Of the two lower-layer coil ends 537, one lower-layer coil end 537, as located at the front side of the starter, is inclined in the direction opposed to that of the upper-layer coil end 534 whereas the other lower-layer coil end 537 at the rear side is also inclined in the direction opposed to that of the upper-layer coil end 534. These two lower-layer coil ends 537 are radially inclined at an equal angle with respect to the lower-layer coil member 537 and are formed into an identical shape. As a result, like the upper-layer coil bar 531, the lower-layer coil bar 531 takes its identical shape even after it is turned by 180 degrees on the lower-layer coil bar 532. In short, the two lower-layer coil ends 537 are made identical to provide an excellent workability when the lower-layer coil bar 532 is assembled with the armature core 520.

The two lower-layer coil ends 537 are formed at their inner circumferential end portions with lower-layer inner extensions 539 extending in the axial direction. The lower-layer inner extensions 539 have their outer circumferences fitted in the recesses 562, which are formed in the inner circumferences of the insulating spacer 560, and overlapped on and electrically and mechanically sealed by the welding to the inner circumferences of upper-layer inner extensions 538 at the end portions of the upper-layer coil ends 534. Incidentally, the lower-layer inner extensions 539 have their inner circumferences insulated and arranged from the armature shaft 510.

On the other hand, the two upper-layer coil ends 534 are formed at their inner circumferential end portions with the upper-layer inner extensions 538 extending in the axial direction. These upper-layer inner extensions 538 have their inner circumferences overlapped on and electrically and mechanically sealed by the welding to the outer circumference of the lower-layer inner extensions 539 which are formed at the inner ends of the later-described lower-layer coil bar 532. Moreover, the upper-layer inner extensions 538 have their outer circumferences abutting through insulating caps 580 on the inner faces of the outer circumferential annular portions 571 of stationary members 570 press-fitted in the armature shaft 510.

[Description of Insulating Spacer 560]

The insulating spacer 560 is a thin sheet ring made of a resin (e.g., an epoxy resin, a phenolic resin or nylon) and formed in its outer circumferential side, as shown in FIG. 13, with the plurality of holes 561, in which are fitted the projections 534a of the individual upper-layer coil ends 534. On the other hand, the insulating spacer 560 is formed in its inner circumference with recesses 562, in which are fitted the lower-layer inner extensions 539 of the lower-layer coil ends 537. These holes 561 and recesses 562 of the insulating spacer 560 are used to position and fix the armature coil 530, as will be described hereinafter.

[Description of Fixing Member 570]

Figure 14:
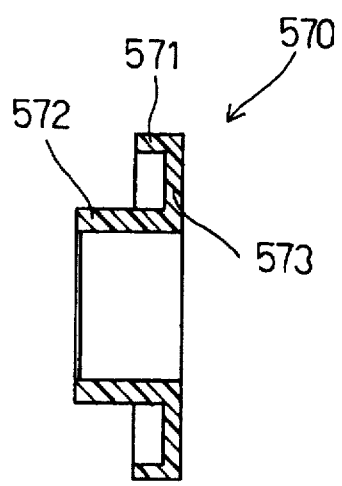
FIG. 14 is a sectional side elevation of a fixing member.
Figure 15:
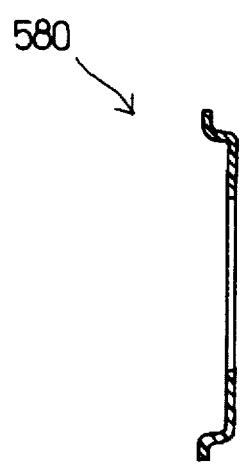
FIG. 15 is a sectional side elevation of an insulating cap.

The fixing member 570 is an iron annular member which is composed, as shown in FIG. 14, of: an inner circumferential annular portion 572 to be press-fitted on the armature shaft 510; a regulating ring 573 extending perpendicularly to the axial direction for blocking the upper-layer coil ends 534 and the lower-layer coil ends 537 from axially extending; and the outer circumferential portion 571 enclosing the upper- layer inner extensions 538 of the upper-layer coil ends 534 for preventing the internal diameter of the armature coil 530 from being extended by the centrifugal force. Incidentally, this fixing member 570 has the disc-shaped insulating cap 580 made of resin (e.g., nylon) and sandwiched between the upper-layer coil ends 534 and the lower-layer coil ends 537, as shown in FIG. 15, so as to ensure the insulations between the upper-layer coil ends 534 and the lower-layer coil ends 537.

The fixing member 570 arranged at the front side of the starter comes into abutment with the rear face of the motor partition 800 adjacent to the front of the fixing member 570 to act as a thrust receiving portion for regulating the forward movement of the armature 540. On the other hand, the fixing member arranged at the rear side of the starter comes into the front face of the brush holding member 900 adjacent to the rear of the fixing member 570 to act as a thrust receiving portion for regulating the backward movement of the armature 540.

Thus, each fixing member 570 for fixing the inner end portion of the armature coil 530 acts as the thrust receiving portion of the armature 540 so that no other thrust receiving portion of the armature 540 need be provided. As a result, the numbers of parts and assembling steps of the starter can be reduced.

[Description of Means for Fixing Armature Coil 530]

The means for positioning and fixing the upper-layer coil bars 531 and the lower-layer coil bars 532 of the armature coil 530 on the armature core 520 is composed of: the slots 524 and the fixing pawls 525 of the armature core 20; the holes 561 and the recesses 562 of the insulating spacer 560, and the fixing member 570 to be press-fitted on the armature shaft 510.

The slots 524 of the armature core 520 receives the upper-layer coil members 533 and the lower-layer coil members 536, and the fixing pawls 525 are folded radially inwards, as indicated by arrows in FIG. 11, so that the upper-layer coil members 533 and the lower-layer coil members 536 are firmly fixed in the Individual slots 524 and are prevented from moving radially outward from the insides of the slots 524 even they receive the centrifugal force. Incidentally, the upper-layer coil members 533 have their outer circumferential surfaces insulated by the two layers of the lower-layer insulating film 125 and the upper-layer insulating film 105 so that it can be sufficiently insured even if the fixing pawls 525 are forcibly folded radially inwards.

The recesses 562 in the inner circumference of the insulating spacer 560 are fitted on the lower layer inner extensions 539 of the lower-layer coil ends 537 to position the lower-layer coil ends 537 and to receive the centrifugal force applied to the lower-layer coil ends 537 thereby to prevent the lower-layer coil ends 537 from moving radially outward.

The holes 561 in the outer circumferential side of the insulating spacer 560 are fitted on the projections 534a of the upper-layer coil ends 534 to position the upper-layer coil ends 534 and to receive the centrifugal force applied to the upper-layer coil ends 534 thereby to prevent the upper-layer coil ends 534 from moving radially outward.

The fixing member 570 protects the upper-layer inner extensions 538 and the lower-layer inner extensions 539 from the surroundings to move the radially inner portion of the armature coil 530 from being moved radially outward by the centrifugal force.

Moreover, the fixing member 570 regulates the movements of the axial end portions of the upper-layer inner extensions 538 and the lower-layer inner extensions 539 thereby to prevent the axial size of the armature coil 530 from increasing. Incidentally, if the upper-layer coil ends 534 and the lower-layer coil ends 537 are axially elongated while the starter is being used, a space estimating the deformation in advance has to be retained in the starter. Thanks to the action of the fixing member 570, however, the upper-layer coil ends 534 and the lower-layer coil ends 537 are prevented from being axially elongated, and any space need not be prepared in the starter of the present embodiment so that the starter can have its axial size reduced.

[Description of Yoke 501]

Figure 16:
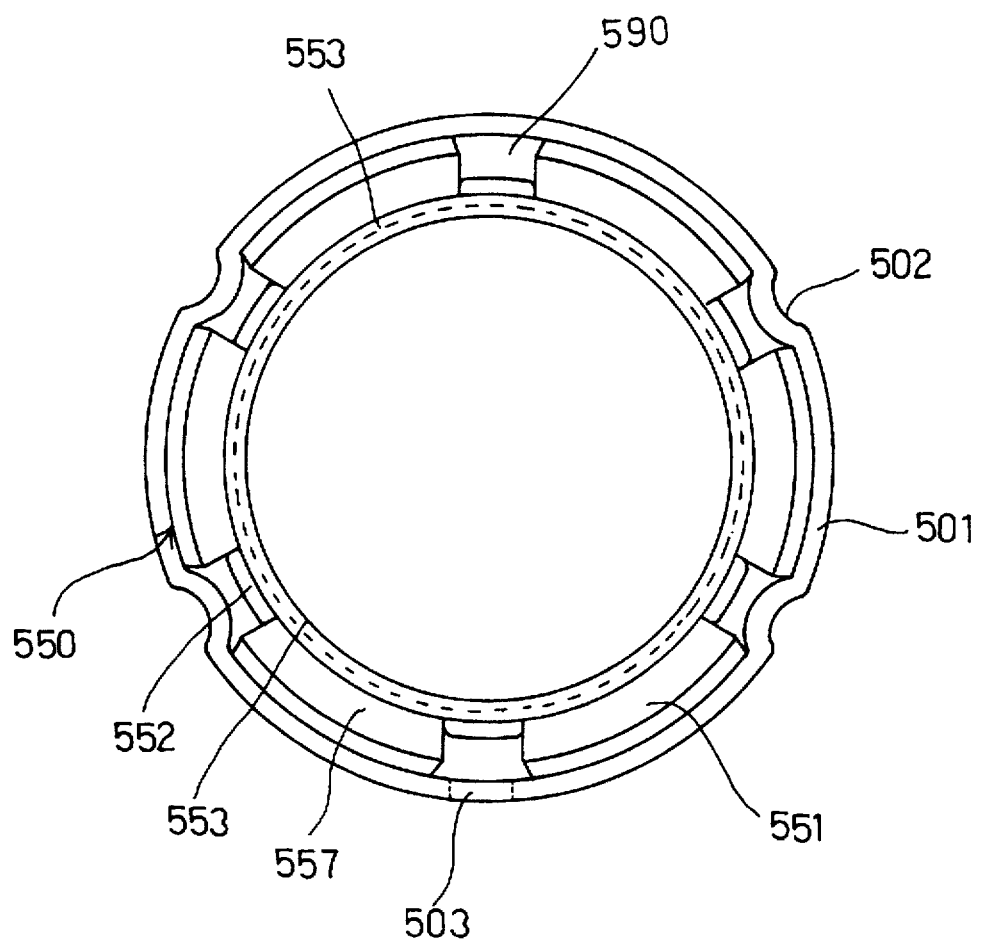
FIG. 16 is a front elevation of a yoke.

The yoke 501 is a cylinder shaped by rounding a steel sheet, as shown in FIG. 16, and is formed in its circumference with a plurality of grooves 502 which are extended axially and recessed radially inwards. These grooves 502 are used to arrange through-bolts and to position the stationary magnetic poles 550 on the inner circumference of the yoke 510.

[Description of Stationary Magnetic Poles 550]

The stationary magnetic poles 550 are exemplified by permanent magnets in the present embodiment and are composed of a plurality of (e.g., six) main magnetic poles 551 and interpole magnetic poles 552 interposed between those main magnetic poles 551, as shown in FIG. 16. Incidentally, the permanent magnets of the stationary magnetic poles 550 may be replaced by field coils for generating magnetic forces when supplied with an electric power.

The main magnetic poles 551 are positioned by the two ends of the inside walls of the recesses 502 of the aforementioned yoke 510 and are fixed together with the interpole magnetic poles 552 between them in the yoke 501 by a fixing sleeve 553 arranged on the inner circumference of the stationary magnetic pole 550.

[Description of Magnet Switch 600]

Figure 17:
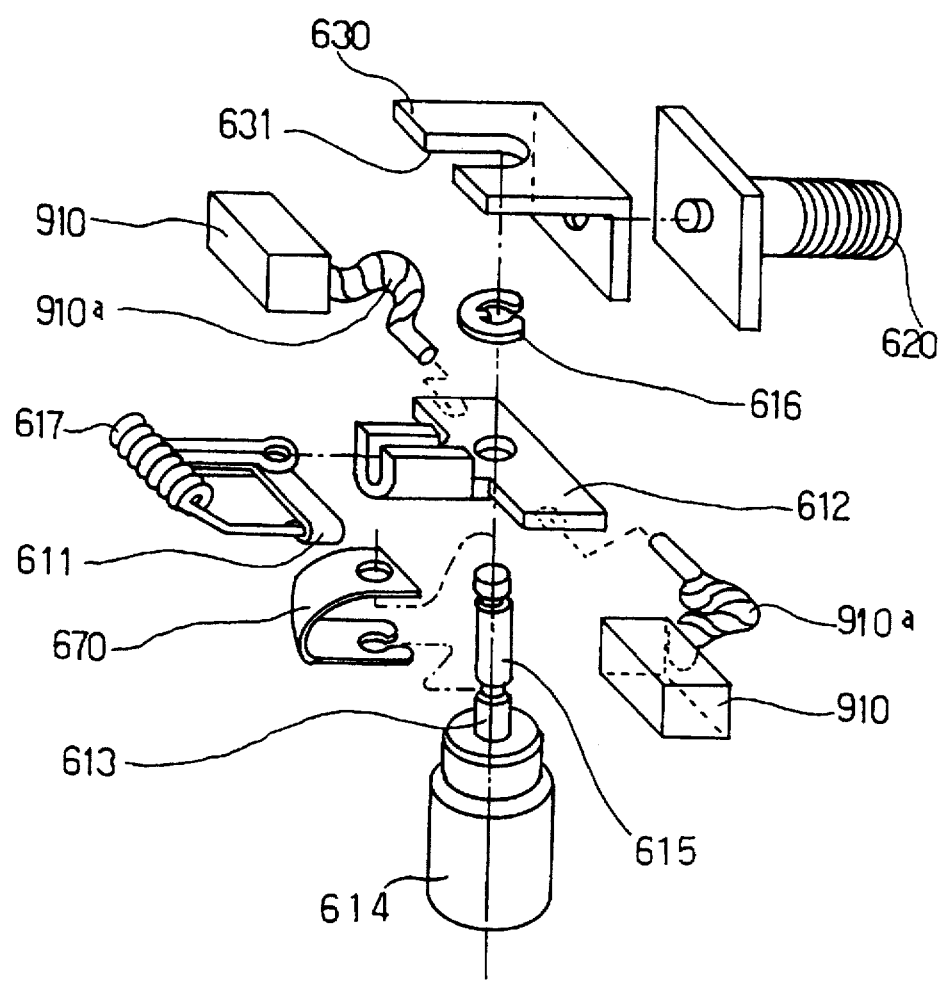
FIG. 17 is an exploded perspective view of a plunger and a stationary contact of a magnet switch.
Figure 18:
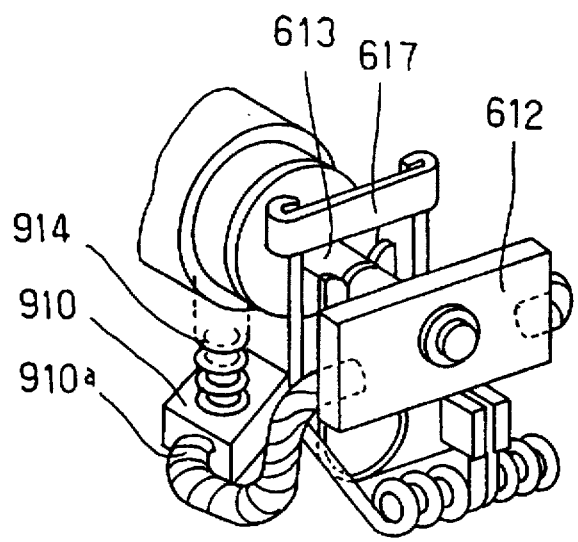
FIG. 18 is a perspective view showing the plunger of the magnet switch.
Figure 19:
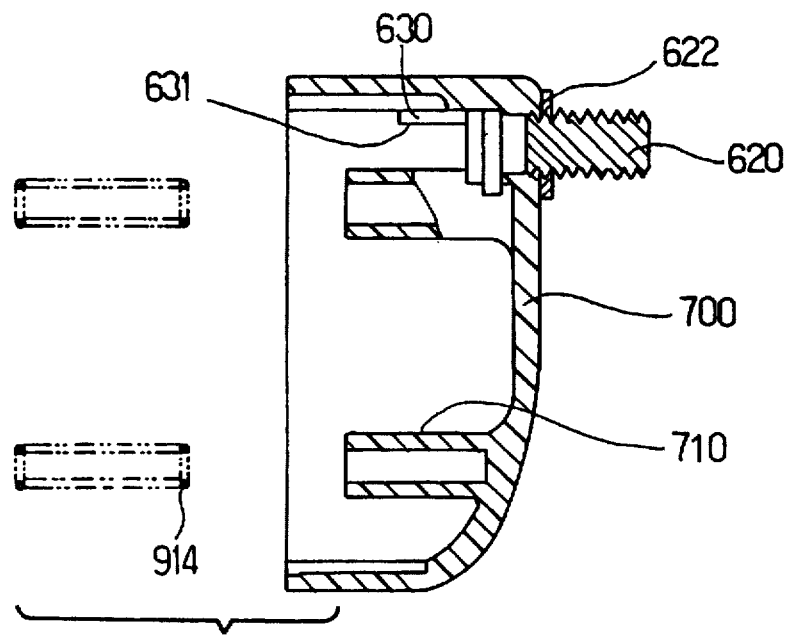
FIG. 19 is a section showing an end frame and a brush spring.

As shown in FIGS. 1, 17 and 18, the magnet switch 600 is held by the later-described brush holding member 900 and arranged in the later-described end frame 700 such that it is fixed generally perpendicularly to the armature shaft 510. Moreover, the magnet switch 600 is arranged perpendicularly to the axial direction of the armature shaft 510.

The magnet switch 600 moves a plunger 610 upwards, when energized, to bring two contacts (i.e., a lower movable contact 611 and an upper movable contact 612) into sequentially contact with the head 621 of a terminal bolt 620 and the abutting portion 631 of a stationary contact 630. Incidentally, the terminal bolt 620 is connected with the not-shown battery cable.

The magnet switch 600 is constructed in a bottomed cylindrical magnet switch cover 640 made of a magnetic material (e.g., iron). This magnet switch cover 640 is prepared by pressing a soft steel sheet, for example, into the shape of a cup having a hole 641 at its bottom center for receiving the plunger 610 movably in the vertical directions. Moreover, the magnet switch cover 640 has its upper opening closed with a stationary core 642 made of a magnetic material (e.g., iron).

The stationary cover 642 is composed of an upper larger-diameter portion 643, a lower intermediate-diameter portion 644 and a lower smaller-diameter portion 645 and is fixed in the upper opening of the magnet switch cover 640 by caulking the upper end of the magnet switch cover 640 inwards with the outer circumference of the larger-diameter portion 643. An attraction coil 650 has its upper end mounted around the intermediate-diameter portion 644. On the outer circumference of the smaller-diameter portion 645 of the stationary core 642, there is mounted the upper end of a compression coil spring 660 for biasing the plunger 610 downwards.

The attraction coil 650 is attraction means for attracting the plunger 610 by generating a magnetic force when energized. This attraction coil 650 is equipped with a sleeve 651 which has its upper end mounted on the intermediate-diameter portion 644 of the stationary core 642 and covers the plunger 610 vertically slidably. This sleeve 651 is prepared by rolling a thin sheet of a non-magnetic material (e.g., copper, brass or stainless steel) and is equipped at its upper and lower ends with insulating washers 652 of a resin. The sleeve 651 is wrapped between the two insulating washers 652 with a (not-shown) insulating film made of a thin resin (e.g., a cellophane or nylon film) or paper, and this insulating film is further wound with a predetermined number of turns of thin enamel wires to construct the attraction coil 650.

The plunger 610 is made of a magnetic metal (e.g., iron) and is formed generally into the shape of a cylinder having an upper smaller-diameter portion 613 and a lower larger-diameter portion 614. The smaller-diameter portion 613 has the lower end of the compression coil spring 660 mounted thereon, and the larger-diameter portion 614 is relatively elongated in the axial direction and held vertically movably in the sleeve 651.

On the upper side of the plunger 610, there is fixed a plunger shaft 615 extending upwards from the plunger 610. The plunger shaft 615 protrudes upward from the through hole which is formed at the center of the stationary core 642. The upper movable contact 612 is carried on the plunger shaft 615 above the stationary core 642 to slide vertically along the plunger shaft 615. This upper movable contact 612 is regulated, as shown in FIG. 17, from moving upwards from the upper end of the plunger shaft 615 by a snap ring 616 attached to the upper end of the plunger shaft 615. As a result, the upper movable contact 612 is made vertically slidable along the plunger shaft 615 between the snap ring 616 and the stationary core 642. Incidentally, the upper movable contact 612 is biased upwards at all times by a contact pressure spring 670 which is made of a leaf spring attached to the plunger shaft 615.

The upper movable contact 612 is made of a metal having an excellent conductivity such as copper and has its two ends brought, when moved upward, into abutment against the two abutting portions 631 of the stationary contact 630. On the upper movable contact 612, moreover, the individual lead wires 910a of the paired brushes 910 are fixed electrically and mechanically by the caulking or welding. In the groove of the upper movable contact 612, moreover, there is inserted and fixed electrically and mechanically the end portion of a resistor 617 for providing a plurality of (e.g., two in the present embodiment) restricting means.

Incidentally, the individual lead wires 910a of the brushes 910 are fixed electrically and mechanically in the upper movable contact 612 by the caulking or welding. However, the upper movable contact 612 and the individual lead wires 910a of the brushes 910 may be integrally formed.

The resistor 617 is constructed of a plurality of turns of metal wire having a high resistance for allowing the motor 500 to rotate at a low speed at the initial stage of the starter operation. On the other end of the resistor 617, there is fixed by the caulking or the like the power movable contact 611 which is positioned below the head 621 of the terminal bolt 620.

The lower movable contact 611 is made of a metal having an excellent conductivity such as copper and is brought into abutment against the upper face of the stationary core 642, when the magnet switch 600 is OFF so that the plunger 610 takes its lower position, and into abutment against the head 621 of the terminal bolt 620 before the upper movable contact 612 comes into the abutment against the abutting portion 631 of the stationary contact 630 when the resistor 617 is carried upwards by the plunger shaft 615.

The plunger 610 is formed in its lower face with a recess 682 for receiving a ball member 681 attached to the rear end of the string member 680 (e.g., wire). The recess 682 has its inner circumferential wall internally threaded, as at 683. Into this internal thread 683, there is fastened a fixing screw 684 for fixing the ball member 681 in the recess 682. The string member 680 has its length adjusted by adjusting the insertion of the fixing screw 684 into the internal thread 683. Incidentally, the length of the string member 680 is adjusted such that the regulating pawl 231 of the pinion rotation regulating member 230 is fitted in the teeth 214 of the outer circumference of the pinion gear 210 when the lower movable contact 611 comes into abutment with the terminal bolt 620. Incidentally, the internal thread 683 and the fixing screw 684 constitute an adjusting mechanism.

[Description of End Frame 700]

The end frame 700 is a magnet switch cover made of a resin (e.g., a phenolic resin) having the magnet switch 600 accommodated therein.

The end frame 700 is formed on its back face with spring holding pillars 710 which are protruded forwards according to the positions of the brushes 910 for holding compression coil springs 914 to bias the brushes 910 forwards.

Moreover, the compression coil springs 914 are arranged, as shown in FIG. 1, at the outer circumferential side with respect to the axial direction of the plunger 610 of the magnet switch 600.

The terminal bolt 620 is a bolt of iron, which is inserted from the inside of the end frame 700 and protruded backwards of the end frame 700 and which is formed at its front side with the head 621 to be brought into abutment against the inner face of the end frame 700. Moreover, the terminal bolt 620 is fixed on the end frame 700 by fixing a caulking washer 622 on the terminal bolt 620 protruded backwards from the end frame 700. The stationary contact 630 made of copper is fixed by the caulking on the front end of the terminal bolt 620. The stationary contact 630 is formed with one or more (i.e., two in the present embodiment) abutting portions 631 disposed on the upper end of the inside of the end frame 700, and the upper movable contact 612 to be vertically moved by the operation of the magnet switch 600 can be brought at its upper face into abutment against the lower face of the abutting portions 631.

[Description of Brush Holding Member 900]

The brush holding member 900 performs not only the role to partition the inside of the yoke 501 and the inside of the end frame 700 while supporting the rear end of the armature shaft 510 rotatably through the brush holding member bearing 564 but also the roles to act as the brush holder, to hold the magnet switch 600 and to act as a pulley 690 for guiding the string member 680. Incidentally, the brush holder 900 is formed with the not-shown hole for guiding the string member 680 therethrough.

Figure 20:
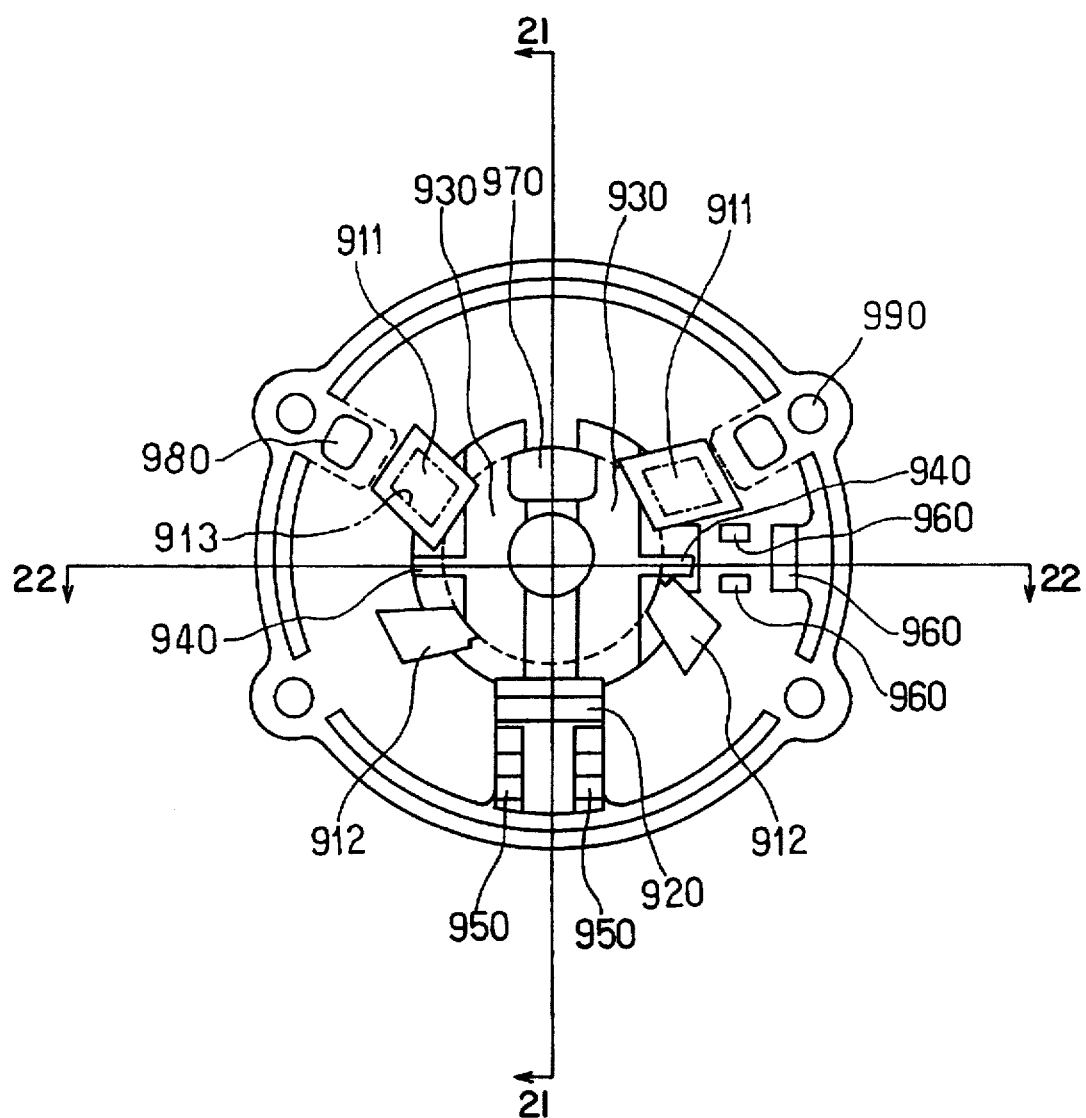
FIG. 20 is a front elevation showing a brush holder.
Figure 21:
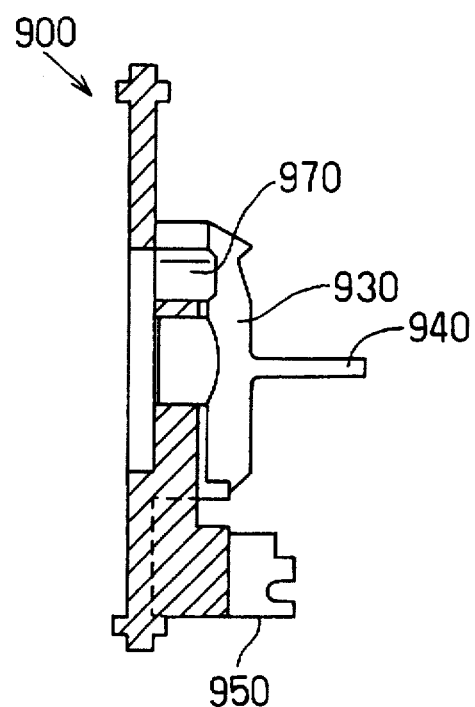
FIG. 21 is a section taken along line 21—21 of FIG. 20.
Figure 22:
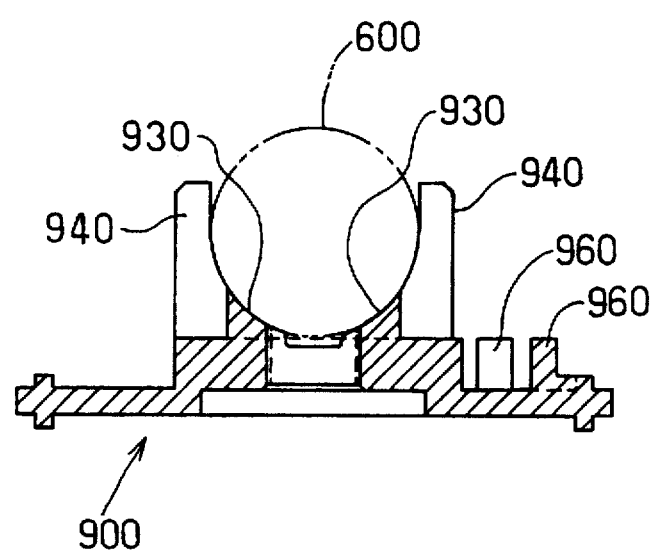
FIG. 22 is a section taken along line 22—22 of FIG. 20.
Figure 23:
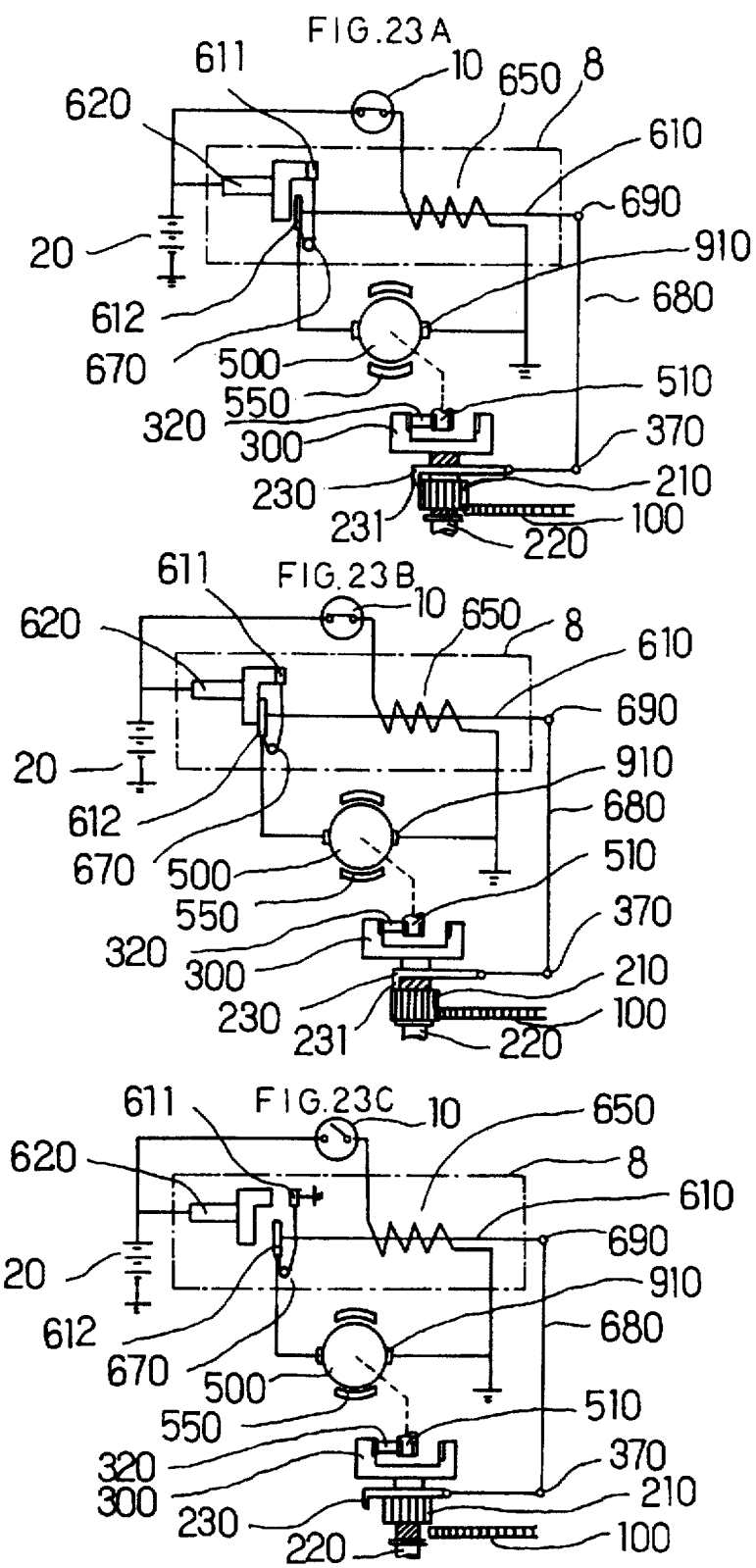
FIGS. 23A, 23B and 23C are electric circuit diagrams showing the working states of the pinion.

The brush holder 900 is a partition shaped by casting a metal such as aluminum and is formed, as shown in FIGS. 20 to 22, with a plurality of (e.g., two at the upper and lower sides in the present embodiment) brush holding holes 911 and 912 for holding the brushes 910 axially. The upper brush holding holes 911 are the holes for holding the brush 910 to receive the plus voltage and hold the brush 910 (as shown in FIG. 21 presenting a section taken along line 21—21 of FIG. 20 and in FIG. 22 presenting a section taken along line 22—22 of FIG. 20) through insulating cylinders 913 made of a resin (e.g., nylon or a phenolic resin). On the other hand, the lower brush holding holes 912 are the holes for holding the brush 910 to be grounded to the ground and hold the brush 910 directly therein.

Since the brushes 910 are thus held by the brush holder 900, it is unnecessary to provide the starter with any independent brush holder. As a result, it is possible to reduce the number of parts and assembling steps of the starter.

Moreover, the brushes 910 are urged by the compression coils 914 to bring their front end faces onto the rear faces of the upper-layer coil ends 534 at the rear side of the armature coil 530.

Incidentally, the upper brush 910 has its lead wires 910a connected electrically and mechanically by the seaming technique such as the welding or caulking to the upper movable contacts 612 to be moved by the magnet switch 600. On the other hand, the lower brush 910 has its lead wires 910a connected electrically and mechanically by the caulking to a recess 920 formed in the rear face of the brush holding member 900. Incidentally, the present embodiment is equipped with a pair of lower brushes 910 which are connected to one lead wire 910a, which has its center caulked in the recess 920 of the rear face of the brush holding member 900.

The brush holding member 900 is formed on its back face with two pedestals 930 for holding the front face of the magnet switch 600, and two stationary pillars 940 for embracing the magnet switch 600.

The pedestals 930 are contoured to the magnet switch 600 having a cylindrical shape so that they may snugly abut the magnet switch 600. On the other hand, the two stationary pillars 940 hold the magnet switch 600 by caulking their individual rear ends while the magnet switch 600 abutting against the pedestals 930.

The brush holding member 900 is formed on the lower side of its rear face with a pulley holding portion 950 for holding the pulley 690 for changing the moving direction of the string member 680 from the vertical direction to the axial direction of the magnet switch 600.

The brush holding member 900 is formed on its rear face with a holding portion 960 for holding a not-shown temperature switch for protection from an overheat. This holding portion 960 holds the temperature switch between the upper brush holding holes 911 and the lower brush holding holes 912 and in the vicinity of the magnet switch 600. Incidentally, the temperature switch turns OFF the magnet switch 600, when a predetermined temperature is reached, to interrupt the power supply to the starter motor thereby to protect the starter.

The brush holding member 900 has its front face disposed in the vicinity of the rear face of the upper-layer coil ends 534 to abut the brushes 910. As a result, the centrifugal wind established by the rotations of the grooves 535 between the upper-layer coil ends 534 is forcibly guided radially outward. In short, the centrifugal wind is established between the upper-layer coil ends 534 at the rear side and the brush holding member 900.

Figure 24:
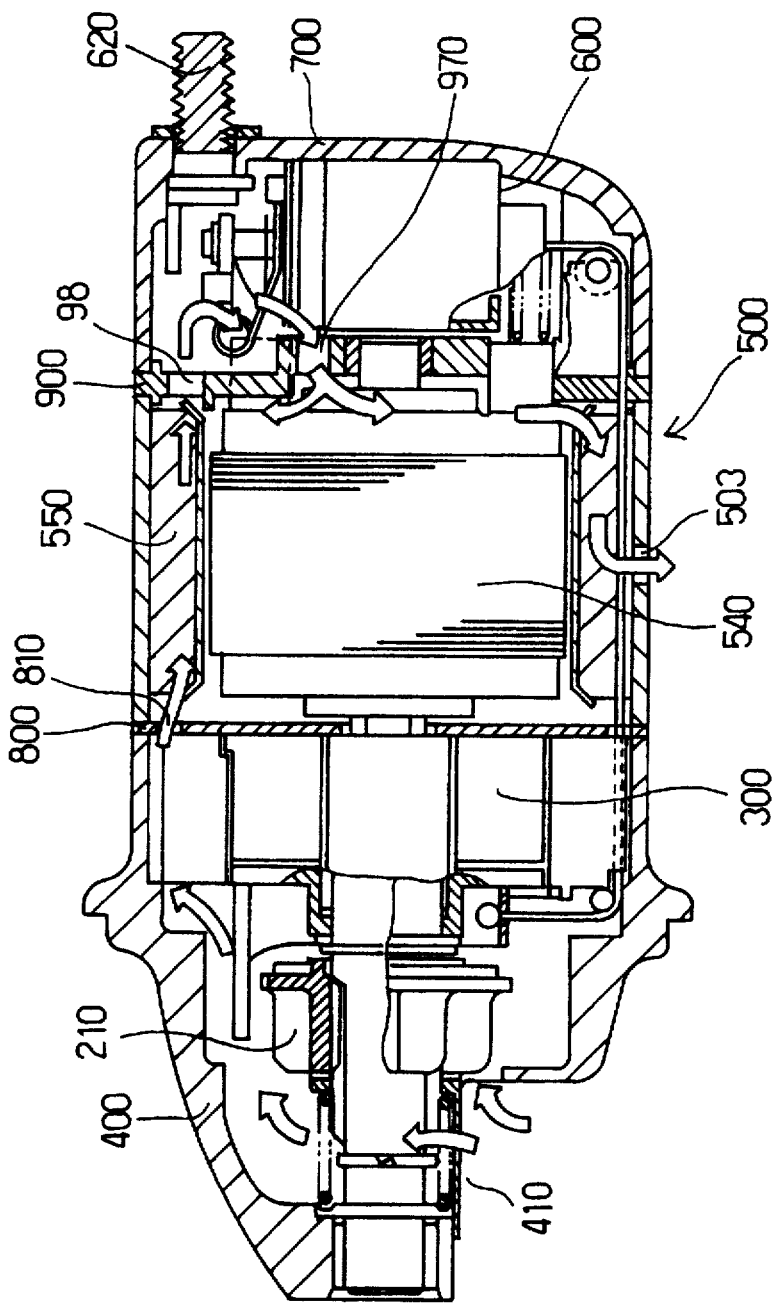
FIG. 24 is a sectional side elevation showing a cooling air passage.

The starter is formed, as shown in FIG. 24, with cooling air passages for introducing the air into the inside between the upper-layer coil ends 534 at the rear side and the brush holding member 900 and for releasing the centrifugal wind to the outside of the starter.

This cooling air passage is formed of: an inlet port 970 opened in the inner circumferential portion of the brush holding member 900 for introducing the air from the inside of the end frame 700 into the inside between the upper-layer coil ends 534 at the rear end and the brush holding member 900; brush holding member communication holes 980 formed in the end frame 700 and in the upper circumference of the brush holding member 900 and communicating with the gaps between the main poles 551 in the yoke 501; the gaps 590 formed between the main magnetic poles 551 and communicating with those brush holding member communicating holes 980; motor partition communication holes 810 formed in the upper circumference of the motor partition 800 and communication with the gaps 590 between the main poles 551; notches 364 formed in the upper side of the center bracket 360 and communicating with the motor partition communication holes 810; and the inside of the housing 400. Thus, the air sucked from the opening 410 of the housing 400 is guided to the inside between the upper-layer coil ends 534 at the rear side and the brush holding member 900 in the course of the inside of the housing 400, the notches 364 in the upper side of the center bracket 360, the motor partition communication holes 810, the gaps 590 between the main magnetic poles 551, the brush holding member communication holes 980, the inside of the end frame 700 and the inlet port 970.

The centrifugal wind established between the upper-layer coil ends 534 at the rear side and the brush holding member 900 is discharged, after having cooled down the sliding faces and the peripheries of the brushes 910, together with the brushed powder to the outside of the starter from a discharge hole 503 formed in the lower end of the yoke 501.

Since the upper-layer coil ends 534 acting as the commutator act as the centrifugal fan to establish the centrifugal wind, it is possible to keep the temperature of the sliding portions between the upper-layer coil ends 534 and the brushes 910 to a low level. Moreover, the brushed powder produced as a result of the wear of the brushes 910 is carried by the centrifugal wind to the discharge hole 503 and discharged therefrom to the outside of the starter thereby to prevent the troubles due to the brushed powder.

[Operations of Embodiment]

Next, the operations of the aforementioned starter will be described with reference to electric circuit diagrams of FIGS. 23A to 23C.

When a key switch 10 is set to the start position by the driver, the electric power is fed from a battery 20 to the attraction coil 650 of the magnet switch 600. When the attraction coil 650 is energized, the plunger 610 is attracted by the magnetic Force generated by the attraction coil 650 so that it is lifted from its lower position.

As the plunger 610 starts its rise, the upper movable contact 612 and the lower movable contact 611 are lifted by the rising plunger shaft 615, and the string member 680 also has its rear end lifted. When the rear end of the string member 680 rises, the front end of the same is pulled downwards so that the pinion rotation regulating member 230 is moved downwards. The lower movable contact 611 is brought into abutment against the head 621 of the terminal bolt 620 (as shown in FIG. 23A) by the downward movement of the pinion rotation regulating member 230, when the regulating pawl 231 is fitted in the teeth 214 on the outer circumference of the pinion gear 210. The terminal bolt 620 is supplied with the voltage of the battery 20 so that its voltage is applied to the upper brush 910 in the course of the lower movable contact 611 the resistor 617 the upper movable contact 612 the lead wire 911. In short, the low voltage through the resistor 617 is applied through the upper brush 910 to the armature coil 530. Since, moreover, the lower brush 910 is always grounded to the ground through the brush holding member 900, the low voltage is applied to the armature coil 530 which is constructed in the coil shape by combining the individual upper-layer coil bars 531 and the individual lower-layer coil bars 532. Then, the armature coil 530 generates a relatively weak magnetic force, which acts upon (i.e., attracts or repulses) the magnetic force of the stationary magnetic pole 550 so that the armature 540 is rotated at a low speed.

As the armature shaft 510 rotates, the planetary gear 320 of the planetary gear mechanism 300 is rotationally driven by the sun gear 310 at the front end of the armature shaft 510. In case the rotating torque of the planetary gear 320 to drive the ring gear 100 rotationally through the planet carrier 330 is to be imparted to the internal gear 340, this internal gear 340 has its rotation regulated by the action of the overrunning clutch 350. In short, the internal gear 340 does not rotate, the planet carrier 330 is decelerated by the rotation of the planetary gear 320. When the planet carrier 330 rotates, the pinion gear 210 will rotate but has its rotation regulated by the pinion rotation regulating member 230 so that it moves forwards along the helical spline 221 of the output shaft 220.

As the pinion gears 210 moves forwards, the shutter 420 also moves forwards to open the opening 410 of the housing 400. As a result of this forward movement, the pinion gear 210 comes into complete meshing engagement with the ring gear 100 of the engine until it comes into abutment with the pinion retaining ring 250. As the pinion gears 210 advances, moreover, the regulating pawl 231 comes out of engagement with the teeth 214 of the pinion gear 210 until its front end drops at the rear side of the washer 215 which is disposed on the rear face of the pinion gear 210.

With the pinion gear 210 being in the forward position, on the other hand, the upper movable contact 612 comes into abutment against the abutting portion 631 of the stationary contact 630. Then, the battery voltage of the terminal bolt 620 is applied directly to the brushes 910 in the course of the upper movable contact 612 and the lead wire 911. In short, the armature coil 530 composed of the individual upper-layer coil bars 531 and the individual lower-layer coil bars 532 is fed with the high current to generate an intense magnetic force thereby to rotate the armature 540 at a high speed.

The rotation of the armature shaft 510 is decelerated by the planetary gear mechanism 300 so that the planet carrier 330 is rotationally driven by the increased rotating torque. At this time, the pinion gear 210 has its front end brought into abutment with the pinion retaining ring 250 so that it rotates together with the planet carrier 330. Since, moreover, the pinion gear 210 is in meshing engagement with the ring gear 100 of the engine, it drives the ring gear 100, i.e., the output shaft of the engine rotationally.

Next, when the engine is started to rotate its ring gear 100 faster than the pinion gear 210, a retracting force is generated in the pinion gear 210 by the action of the helical spline. Since, however, the pinion gear 210 is blocked from its backward movement by the rotation regulating pawl 231 having dropped at the back of the pinion gear 210, the engine can be started without fail while preventing the premature disengagement of the pinion gear 210 (as shown in FIG. 23B).

When the started engine has its ring gear 100 rotated faster than the pinion gear 210, this pinion gear 210 is rotationally driven by the ring gear 100. Then, the rotating torque having been transmitted from the ring gear 100 to the pinion gear 210 is further transmitted through the planet carrier 330 to the pin 332 supporting the planetary gear 320. In other words, the planetary gear 320 is driven by the planet carrier 330. Then, a torque reversed from that for the engine starting time is applied to the internal gear 340 so that the overrunning clutch 350 allows the ring gear 100 to rotate. More specifically, if the torque reversed from that for the engine starting time is applied to the internal gear 340, the roller 353 of the overrunning clutch 350 comes out of the recess of the clutch inner 352 to allow the rotation of the internal gear 340.

In short, the relative rotation of the ring gear 100 of the started engine to drive the pinion gear 210 rotationally is absorbed by the overrunning clutch 350 so that the armature 540 is not rotationally driven by the engine.

After the engine has been started, the key switch 10 is moved out of the start position by the driver to stop the power supply to the attraction coil 650 of the magnet switch 600. When the power supply to the attraction coil 650 is stopped, the plunger 610 is returned back downward by the action of the compression coil spring 660.

Then, the upper movable contact 612 leaves the abutting portion 631 of the stationary contact 630, and the lower movable contact 611 then leaves the head 621 of the terminal bolt 620 to interrupt the power supply to the upper brush 910.

When the plunger 610 is returned downwards, the pinion rotation regulating member 230 is returned upwards by the action of its return spring portion 236 so that the regulating pawl 231 leaves the back of the pinion gear 210. Then, the pinion gear 210 is returned backwards by the action of the return spring 240 to come out of meshing engagement with the ring gear 100 of the engine and to bring its rear end into abutment against the flange-shaped protrusion 222 of the output shaft 220. In short, the pinion gear 210 is returned to the stage before the start of the starter (as shown in FIG. 23C).

As a result that the plunger 610 is returned downwards, moreover, the lower movable contact 611 comes into abutment with the upper face of the stationary core 642 of the magnet switch 600 so that the lead wire 910a of the upper brush 910 is turned conductive in the course of the upper movable contact 612, the resistor 617, the lower movable contact 611, the stationary core 642, the magnet switch cover 640 and the brush holding member 900. In short, the upper brush 910 and the lower brush 910 are short-circuited through the brush holding member 900. Meanwhile, an electromotive force is generated in the armature coil 530 by the inertial rotation of the armature 540. Moreover, this electromotive force is short-circuited through the upper brush 910, the brush holding member 900 and the lower brush 910 so that the braking force is applied to the inertial rotation of the armature 540. As a result, the armature 540 is abruptly stalled.

[Effects of Embodiment]

Since, in the embodiment thus far described, the lower-layer coil ends 537 and the upper-layer coil ends 534 forming the first and second connecting portions are held in abutment against the end face of the armature core 500 through the insulators, the inertias of the cylindrical commutators and the armature coils in the prior art are reduced to reduce the inertia drastically as that of the armature 540. As a result, while the pinion gear 210 is meshing with the ring gear 100, the impact torque at the time of inertial rotation can be reduced to reduce the module of the used gear to M=0.9. At the same time, the reaction force R, of the armature bearing 570 can be reduced by the weight of the cylindrical commutator of the prior art, and its support distribution can be reduced to l'/L', as compared with the value l/L of the prior art, to reduce the diameter of the bearing. As a result, the sun gear 310 can have its tooth number reduced to Zs=8 (i.e., the deddendum diameter of=5.85), and the reduction ratio can be set to I=8.25. Hence, the motor volume can be reduced to I=8.25, as compared with I=6 or less in the prior art, so that the motor can be small-sized.

Due to the grooves 535 in the gaps of the individual upper-layer coil ends 534, moreover, the centrifugal wind is produced radially outward by the grooves 535 of the upper-layer coil ends 534 as the armature coil 530 rotates. Moreover, the air thus established by the individual grooves 35 of the individual upper-layer coil ends 534 abutting against the brushes 910 and sucked from the opening 410 of the housing 400 is guided to the inside between the upper-layer coil ends 534 at the rear side and the brush holding member 900 in the course of the inside of the housing 400, the notches 364 in the upper side of the center bracket 360, the motor partition communication holes 810, the gaps 590 between the main magnetic poles 551, the brush holding member communication holes 980, the inside of the end frame 700 and the inlet port 970.

The centrifugal wind established between the upper-layer coil ends 534 at the rear side and the brush holding member 900 is discharged, after having cooled down the sliding faces and the peripheries of the brushes 910, together with the brushed powder to the outside of the starter from a discharge hole 503 formed in the lower end of the yoke 501.

Since the upper-layer coil ends 534 acting as the commutator act as the centrifugal fan to establish the centrifugal wind, it is possible to keep the temperature of the sliding portions between the upper-layer coil ends 534 and the brushes 910 to a low level.

As a result, the shortage of the thermal radiation, which is caused at the speed reduction ratio I=8.25 by the less motor surface area than that of the prior art, is solved by the air-cooling effect so that the size of the motor can be reduced with a sufficient heat resisting performance.

Moreover, the means for restricting the power supply to the starter motor 500 within a predetermined time period by sensing the heat liberated from the motor may be exemplified by another protecting unit which is arranged with heat sensing elements such as bimetal elements in the vicinity of the heat sensing portions, the brush device 900, the field device 550, the yoke 501 and the end frame 700 to turn OFF the power supply of the magnet switch 600 to the attraction coil 650, when the motor temperature reaches a predetermined level, thereby to stop the power supply to the starter motor. The bimetal elements are of the working type but may be exemplified by the self-holding type in which the OFF state is held when the element is opened. In case the aforementioned protecting device is used together, the armature having a generally helical commutator in the armature core need not be used together, but the armature of the prior art may be used. Still moreover, a timer unit may be assembled in the starter control circuit to restrict the time period for the power supply to the starter.

Thus, according to the present invention, the starter can have its size and weight remarkably reduced, as compared with the starter of the prior art, by clarifying the optimum range of 6 to 10 for the high reduction ratio range I=6 or more, unlike the prior art, and by setting I=8.25.

Since the starter can be drastically small-sized according to the present embodiment, the starter can be effectively mounted in the dead space, which cannot mount it in the prior art, such as the engine flywheel or the oil pan below the engine.

INDUSTRIAL APPLICABILITY

As has been described hereinbefore, the starter according to the present invention can be utilized as a starter having a reduction gear mechanism for starting an internal combustion engine.

We claim:

1. A starter comprising:
  a starter motor including an armature core having an armature coil wound thereon and an armature shaft for holding said armature core rotatably;
  a drive shaft having a pinion meshing with a ring gear of an engine; and
  a reduction gear mechanism interposed between said drive shaft and said armature shaft of said starter motor for reducing the rotation relative to said armature shaft to transmit the reduced rotation to said drive shaft, wherein said reduction gear mechanism having a speed reduction ration of 6:1 to 10:1,
  wherein said reduction gear mechanism is a planetary reduction gear mechanism including:
    a sun gear formed at one end of said armature shaft;
    a planetary gear mounted on one end of said drive shaft and meshing with said sun gear; and
    an internal gear meshing with said planetary gear for forming a stationary side, wherein said reduction gear mechanism is of a single unit type and the planetary gear transmits rotation of said armature shaft to said drive shaft.

2. A starter according to claim 1, wherein said armature coil includes:

upper-layer and lower-layer coil members fitted in slots of said armature core;

first connection portions connected to one end of said lower-layer coil member and extending generally in parallel with an axial end face of said armature core and in said shaft direction; and second connection portions connected to one end of said upper-layer coil member and the other end of said first connection portions and extending generally in parallel with said first connection portions.

3. A starter according to claim 2, further comprising:

insulators interposed between said first connection portions and said armature core and between said first connection portions and said second connection portions; and brushes arranged slidably on said second connection portions.

4. A starter according to any of the claims 1 to 3, further comprising:

a cooling fan for cooling sliding faces of said starter motor with said brushes.

5. A starter according to claim 4, further comprising:

grooves formed between said second connection portions to protrude with respect to a rotating direction of said armature shaft so as to act as said cooling fan for producing a cooling wind when said armature coil rotates.

6. A starter according to any of the claims 1 to 3, further comprising:

limit means for limiting the power supply to said starter motor within a predetermined time period.

7. A starter according to claim 1, wherein said reduction gear mechanism has a speed reduction ratio of about 8.25:1.

8. A starter according to claim 1, wherein the reduction ratio is set so that the total volume $V_T = V_1 + V_2$, where $V_1$=volume of the starter motor and $V_2$=the volume of the planetary gear mechanism, is substantially at a minimum.

9. A starter according to claim 1, satisfying the following relationship:

$I = Zi/Zs + 1$ where $Zi$=the number of teeth of the internal gear, $Zs$=the number of teeth of the sun gear, and $I$=the reduction ratio.

10. A starter as in claim 9, wherein the $Zi=58$ and $Zs=8$.

11. A starter as in claim 1, wherein an external diameter of the motor is set to 68 mm and an external diameter of the internal gear is set to 58 mm.

* * * * *